United States Patent
Knapp et al.

(10) Patent No.: US 10,022,905 B2
(45) Date of Patent: Jul. 17, 2018

(54) ADIABATIC HIGH PRESSURE GENERATION

(71) Applicant: KRONES AG, Neutraubling (DE)

(72) Inventors: Peter Knapp, Schmatzhausen (DE); Konrad Senn, Regensburg (DE); Manfred Huber, Wenzenbach (DE)

(73) Assignee: Krones, AG, Neutraubling (DE)

( * ) Notice: Subject to any disclaimer, the term of this patent is extended or adjusted under 35 U.S.C. 154(b) by 124 days.

(21) Appl. No.: 15/185,302

(22) Filed: Jun. 17, 2016

(65) Prior Publication Data

US 2016/0375625 A1    Dec. 29, 2016

(30) Foreign Application Priority Data

Jun. 25, 2015    (DE) .................. 10 2015 110 204

(51) Int. Cl.
*B29C 49/06*    (2006.01)
*B29C 49/36*    (2006.01)
(Continued)

(52) U.S. Cl.
CPC .......... *B29C 49/4284* (2013.01); *B29C 49/36* (2013.01); *B29C 49/4236* (2013.01);
(Continued)

(58) Field of Classification Search
USPC .... 264/37.16, 500, 503, 523, 524, 526, 535, 264/542, 572
See application file for complete search history.

(56) References Cited

U.S. PATENT DOCUMENTS

| 7,790,097 B2 | 9/2010 | Litzenberg et al. |
| 9,314,957 B2 | 4/2016 | Hirdina et al. |

(Continued)

FOREIGN PATENT DOCUMENTS

| DE | 102013110132 | 3/2015 |
| EP | 2722150 | 4/2014 |

(Continued)

OTHER PUBLICATIONS

Machine translation of WO 1996/25285 (Dec. 12, 2017).*

(Continued)

*Primary Examiner* — Sing P Chan
(74) *Attorney, Agent, or Firm* — Onello & Mello, LLP.

(57) ABSTRACT

The invention relates to a system for transforming plastics material preforms into plastics material containers having a plurality of blow molding stations which are arranged on a carrier and in each case comprise a blow mold for expanding plastics material preforms into plastics material containers inside this blow mold by means of a pressurized pneumatic medium which is supplied to the respective blow molding station via a pressure supply device and which is at least partially extracted again from the respective blow molding station after the expansion operation via a pressure extraction device. According to the invention it has an energy conversion device, with the aid of which at least part of the potential energy stored in an energy store can be turned into an increase in the potential energy of a pneumatic medium associated with at least one blow mold, wherein the energy conversion device has an intermediate energy storage device, and at least part of the potential energy extracted from the energy store, and the energy transmitted by the energy conversion device, can be stored in the form of kinetic energy in the intermediate energy storage device.

16 Claims, 9 Drawing Sheets

(51) Int. Cl.
*B29C 49/42* (2006.01)
*B29C 49/78* (2006.01)
*B29L 31/00* (2006.01)

(52) U.S. Cl.
CPC .............. *B29C 49/78* (2013.01); *B29C 49/06* (2013.01); *B29C 2949/78563* (2013.01); *B29L 2031/712* (2013.01); *Y02P 70/267* (2015.11); *Y02P 70/271* (2015.11)

(56) References Cited

U.S. PATENT DOCUMENTS

| | | |
|---|---|---|
| 2008/0128958 A1 | 6/2008 | Litzenberg et al. |
| 2014/0110874 A1 | 4/2014 | Bielmeier |
| 2014/0124988 A1 | 5/2014 | Hirdina et al. |
| 2015/0076747 A1 | 3/2015 | Winzinger et al. |

FOREIGN PATENT DOCUMENTS

| | | |
|---|---|---|
| WO | 9625285 | 8/1996 |
| WO | 2006029584 | 3/2006 |
| WO | 2013004657 | 1/2013 |

OTHER PUBLICATIONS

Extended European Search Report dated Nov. 18, 2016, issued in corresponding German Application No. 16176274.5.
German Search Report dated Mar. 24, 2016, issued in corresponding German Application No. 10 2015 110 204.8.

\* cited by examiner

ADIABATIC HIGH PRESSURE GENERATION

The present invention relates to a system and a method for transforming plastics material preforms into plastics material containers, with a plurality of blow moulding stations which are arranged on a carrier and in each case comprise a blow mould for expanding plastics material preforms into plastics material containers inside this blow mould by means of a pressurised pneumatic medium which is supplied to the respective blow moulding station via a pressure supply device and is at least partially extracted again from the respective blow moulding station after the expansion operation via a pressure extraction device.

Such systems and methods for expanding containers are used for example in the beverage container manufacturing industry.

The shaping of bottles or the inflation of a preform respectively to form a container according to a required configuration usually takes place in an inflation or stretch blow moulding process respectively. For this purpose a corresponding preform is introduced into a blow mould, which generally has at least two parts and can be closed, of a blow moulding station, which mould in the closed state form a cavity in its interior, the wall of which corresponds to the external shape of a finally blow moulded container. In the prior art the expansion or the inflation respectively of the preform typically takes place in at least two stages. In a first stage the preform is first of all subjected to preliminary blow moulding with compressed air at a lower pressure, which may for example be between 6 and 25 bar, and subsequent in the so-called high pressure phase is acted upon with compressed air at a pressure level of 20 to 40 bar and thereby subjected to final blow moulding. This therefore necessitates the production of a pneumatic medium at such high pressures. In the prior art this is achieved using multi-stage compressors.

The expansion operation of the preform is only one processing operation within the production process. Thus, for example, before the expansion operation further processing operations such as preheating, heating, disinfecting and drying of the preform are carried out one after the other by different processing devices. In the prior art the blow moulding stations are typically arranged on a rotatable carrier.

There are already ideas for achieving the compressed air generation directly on the system for transforming the plastic preforms into plastic containers, i.e. to arrange it on the rotatable carrier. The publication document of the patent application DE 10 2011 106 652 A1 describes for example a system in which for each blow mould unit a pressure generating unit is provided which in each case generates high pressure virtually adiabatically for the blow moulding process. Because of the mode of operation of the units this is also partially justified, since in each case the pressure must be generated in each container in order to keep dead spaces as small as possible and thus to operate the system as efficiently as possible in terms of energy.

However, since the individual units are partially large and heavy, they are not so easy to integrate on the rotatable carrier, which furthermore leads to enormous costs.

However, it is also conceivable for the moulds to be installed on a stationary carrier. In this embodiment the main focus is not placed on the ease of installation, but the costs of the plurality of compressor units on which savings can be made by the invention.

High demands are made for the construction of such transforming devices. They should be capable of operation as efficiently as possible in terms of energy. These include for example generating the compressed air as economically as possible and the best possible recycling of the compressed air remaining after conclusion of the inflation operation or recycling of the energy stored therein respectively. Simultaneously, however, the transforming devices should also offer the greatest possible variability with regard to different types of container to be produced which require different volumes of compressed air for shaping.

The object of the present invention therefore is to provide an energy-efficient approximately adiabatic high pressure generation for systems for transforming plastics material preforms into plastics material containers, which system gives the user sufficient scope for adaptation to different types of container to be produced.

This object is achieved according to the invention by the subject matters of the independent claims. Advantageous embodiments and further developments form the subject of the dependent claims.

The system according to the invention for transforming plastics material preforms into plastics material containers has a plurality of blow moulding stations which are arranged on a carrier and in each case comprise a blow mould for expanding plastics material preforms into plastics material containers inside this blow mould by means of a pressurised pneumatic medium which is supplied to the respective blow moulding station via a pressure supply device and which is at least partially extracted again from the respective blow moulding station after the expansion operation via a pressure extraction device.

According to the invention the system has an energy conversion device, with the aid of which at least part of the potential energy stored in an energy store can be turned into an increase in the potential energy of a pneumatic medium associated with at least one, preferably precisely one blow mould.

Furthermore according to the invention the energy conversion device has an intermediate energy storage device, in which at least part of the potential energy extracted from the energy store, and in particular the energy transmitted by the energy conversion device, can be stored in the form of kinetic energy.

In a preferred embodiment the energy conversion device is suitable and intended to extract at least part of the potential energy stored in the energy store, and at least intermittently to store a proportion of this extracted energy in the intermediate energy storage device in the form of kinetic energy, and simultaneously therewith to turn a further proportion of the extracted energy (directly) into an increase in the potential energy of the pneumatic medium associated with the at least one, preferably precisely one, blow mould.

Furthermore, in a preferred embodiment the energy conversion device is suitable and intended to extract at least part of the potential energy released during the decompression of a pneumatic medium associated with a blow mould, and at least intermittently to turn a proportion of this extracted energy into an increase in the potential energy of the energy store, and preferably simultaneously therewith to store a further proportion of the extracted energy in the intermediate energy storage device in the form of kinetic energy.

By means of the system according to the invention the applicant achieves an adaptation of the energy output to the force profile over time which must be applied during compression of a pneumatic medium. This utilises the fact that during the compression of a pneumatic medium the force to be applied increases (with the compression path), whereas for example the force released during the decompression of a pneumatic medium decreases with the expansion path. If for example this decompression is coupled to compression by means of a common piston so that they proceed at the same time, at the start of the compression or decompression operation respectively an excess force is obtained from the expansion. The situation is similar in the case of coupling of the compression piston to a spring element. Here too, when the initially tensioned spring is relaxed a greater force is released than would be necessary due to the compression by the corresponding way.

Therefore it is preferably necessary for the energy which is set free at the start of the compression in the excess force of the initial tension to be stored intermediately so that it can be reused at the end of the compression operation. This takes place through the conversion of potential energy into kinetic energy and vice versa.

Therefore due to the system according to the invention it is proposed to use the excess force efficiently and to store it in the form of kinetic energy in the intermediate energy storage device.

In this case a pressure supply device or a pressure extraction device respectively is understood to be a device which is capable of guiding a pneumatic medium from one device to a further device or of producing a fluid communication between the two devices respectively.

An increase in the potential energy of a pneumatic medium is therefore understood in particular to be a pressure increase and/or a temperature increase of this pneumatic medium. A pressure increase advantageously takes place to a pressure level suitable for the high pressure phase, particularly advantageously a pressure level between 20 and 40 bar.

Advantageously the potential energy stored in the energy store is at least partially, preferably completely, the energy obtained from a (preferably adiabatic) decompression of a pneumatic medium which has been used for a shaping process in at least one, preferably precisely one, blow mould.

In this sense to at least one first, and preferably precisely one first blow mould at least one further, and preferably precisely one further blow mould can be assigned, which, proceeding from the reduction of the pressure of the pneumatic medium in a first blow mould, a pneumatic medium with increased pressure is supplied (i.e. with a higher pressure than the pneumatic medium located therein before the delivery).

The reduction or the increase respectively in the pressure of a pneumatic medium in a blow mould or a blow moulding station respectively should be understood in such a way that, where appropriate, the pressure of a pneumatic medium in a plastics material container (or plastics material preform respectively) which is located in this blow mould or blow moulding station respectively can be reduced or increased respectively.

In a further preferred embodiment the energy conversion device has at least one compression cylinder. Thus the piston of the compression cylinder can function as an energy converter and potential energy extracted from the energy store can be used to drive the piston and to compress pneumatic medium in the compression chamber of the compression cylinder. Advantageously the chamber on the rear side of the piston and/or the compression chamber of the compression cylinder can be used as an energy store for potential energy.

For this purpose means for pretensioning of a piston of the compression cylinder can preferably be provided in the energy conversion device, advantageously as an energy store for potential energy. For example, such a means can be provided by a spring element. However, pretensioning of the piston can also be implemented by acting upon a pressure chamber of the compression cylinder on the rear side of the piston, a so-called pretensioning chamber, with pneumatic or hydraulic medium.

In the case of a spring element the energy extraction can take place by the conversion of potential energy from the spring unit into kinetic energy in the drive and oscillating weight and back again into potential energy in the compression cylinder (the energy conversion device) (correspondingly rearwards during pressure relief).

Thus the compression cylinder preferably has a chamber for pretensioning and a chamber for generating the high pressure of the pneumatic medium. The pretensioning can preferably also serve as a drive (drive device), wherein the pressure level can be varied in the forward and return stroke. Thus for example the pressure during the forward stroke can be constant at 16 bar, and for example during the return stroke can merely be 13 bar. Since in a force-path diagram the energy corresponds to the surface below the graphs, it is shown that in terms of energy the system can be operated with a lower pretensioning force than the maximum force of the compression cylinder. However, this is not possible in static terms. Therefore it is preferably necessary for the energy which is released at the start of the compression in the excess force of the pretension to be stored temporarily so that it can be reused at the end of the compression operation. This takes place by the conversion of potential energy into kinematic energy and vice versa.

In a further preferred embodiment, the pneumatic medium which is used in an expansion operation inside a blow moulding station and at least partially delivered to a pressure chamber of a compression cylinder can be used in the energy conversion device as an energy store for potential energy. For this purpose after termination of an expansion operation in a blow moulding station the pressurised pneumatic medium located therein can be delivered by means of the pressure extraction device to the pressure chamber of the compression cylinder of the energy conversion device, or a fluid communication between the blow moulding station and the pressure chamber can be produced respectively. The piston of the compression cylinder can be driven by the potential energy of this pneumatic medium and as a result potential energy can be extracted and transferred.

In a preferred embodiment the intermediate energy storage device can have a pivotable or a rotatable mass respectively as kinematic intermediate storage means. In this case the pivotable or rotatable mass respectively may not only be a solid but also a fluid, in particular a hydraulic liquid.

In a further advantageous embodiment the kinematic intermediate storage means is a flywheel. Thus energy in the form of kinetic energy can be stored intermediately in the intermediate energy storage device in that the flywheel is set in rotation or is deflected respectively, particularly preferably by a crank mechanism. The energy stored intermediately in the intermediate storage device, in this case in the flywheel, can, preferably towards the end of an operation for transmission of energy from the energy store to increase the potential energy of a pneumatic medium associated with at least one blow mould, likewise be transmitted to the pneumatic medium and thus lead to a further increase in the potential energy of the pneumatic medium.

Since the amount of energy (extracted from the potential energy store) is enormous and at the same time the piston speed is limited, the kinetic energy can preferably be stored intermediately by a transmission or by a very high mass. A crank mechanism is a particularly advantageous solution here, since firstly the movement is converted into rotation, the inertial mass can be significantly reduced and due to the infinite transmission in the dead centre the piston can be held in its end position with a lower force.

Advantageously by a coupling of a compression cylinder to a crank mechanism favourable lever ratios can be achieved in the end positions of the compression cylinder piston. As a result (virtually) no retaining force is necessary in the end positions. Furthermore, this conversion involves a simple mechanism.

In the case of pretensioning, as described above, it proves advantageous that only slight performance peaks are obtained. Further advantages are provided by the possibility of pressure variation and the adaptation to different container volumes, as well as a reduction in the inert mass.

Hydraulic medium is preferably used as kinematic intermediate storage means, particularly preferably in combination with a hydraulic cylinder which is advantageously coupled to a compression cylinder.

In a further advantageous embodiment in the intermediate energy storage device at least an amount of energy of 100 J, preferably of at least 500 J, preferably of at least 1 kJ and particularly preferably of at least 2 kJ, of the energy which is extracted from the energy store and in particular is transmitted by the energy conversion device can be stored intermediately in the intermediate energy storage device.

Preferably by means of the energy conversion device a reduction of the pressure of the pneumatic medium within at least one and preferably precisely one first blow mould can be coupled, particularly preferably directly coupled, to the increase in the pressure of a pneumatic medium which is provided for introduction into the at least one and preferably precisely one further blow mould for expanding a plastics material preform to a plastics material container. In particular, preferably no annular channel is provided from which the blow moulds are (jointly) supplied with pneumatic high-pressure medium and thus are particularly preferably expanded. Particularly preferably the said pneumatic medium, which is provided for introduction into the at least one or precisely one further blow mould respectively for expanding the plastics material preform located therein to form a plastics material container, is delivered simultaneously or subsequently (with respect to the operation of reducing the pressure in the at least one first blow mould) directly to the at least one or precisely one further blow mould respectively. At this point "directly" is understood to mean that this takes place without previously being fed (or passed respectively) for example into (or through respectively) a reservoir for a pneumatic medium under high pressure.

The blow moulding station in which the next plastics material container to be inflated is located is preferably connected directly to the compression cylinder of the energy conversion device which produces the compressed pneumatic medium used for the expansion operation.

Thus a system is advantageously proposed which is configured in such a way that by means of the pressure reduction of the pneumatic medium within at least the first or the first blow mould respectively (preferably using an additional drive) a predetermined volume of a pneumatic medium is compressed substantially directly in such a way that the compressed volume (and thus the generated pressure) of this pneumatic medium is (precisely) sufficient for transforming a plastics material preform into a plastics material container in the at least one further or precisely one further blow mould respectively. The further blow mould is preferably a blow mould in which a preform is still at an earlier stage or in an earlier phase respectively, preferably in a preliminary blow moulding phase.

In an advantageous embodiment a reduction of the pressure of the pneumatic medium within at least one first blow mould can be coupled to the increase in the pressure of the pneumatic medium in at least one further blow mould. In this case such a coupling can also take place at the same time or also with a time delay take place.

In each case two or more blow moulds can preferably also be in fluid communication with one another or a fluid communication can be produced respectively, so that the potential energy of the pneumatic medium associated with these blow moulds can be used as a potential energy store of the energy conversion device. The energy conversion device then preferably converts the energy extracted from the potential energy store into an increase in the potential energy of the pneumatic medium which is likewise associated with two or more blow moulds. Particularly preferably the number of first blow moulds corresponds precisely to the number of latter blow moulds. A vibration-free coupling of the pressure reduction of one pneumatic medium to the pressure increase of the other pneumatic medium is preferably provided.

The pressure supply device and the pressure extraction device are preferably not in fluid communication with one another. The system preferably has several pressure supply devices and also several pressure extraction devices, which particularly preferably are not in fluid communication with one another.

The pressure supply device as well as the pressure extraction device preferably each have several conduits for conveying the pneumatic medium. Thus the two devices can in each case be designed for instance as a supply star. Parts of the pressure supply device and the pressure relief device, for example the conduit system of a supply star up to the connections of the blow moulding stations, are preferably dependent upon the time thereof and are separated from one another by valves.

The carrier is preferably designed as a rotatable carrier, in particular as a so-called blow moulding wheel.

Each of the blow moulding stations preferably has an application device which is advantageously movable relative to the blow mould and can be applied to a mouth of the plastics material preforms or the plastics material containers. Such an application device can preferably be fluidically connected to a pressure supply device and a pressure extraction device. Such an application device could for example be a blow moulding die.

Each of the blow moulding stations preferably has a stretching rod for stretching the plastics material preforms, i.e. a rod-like body which can be introduced into the plastics material preforms via the mouth thereof.

A plurality of blow moulding stations should be understood in this case to be at least two blow moulding stations, preferably between two and 100 blow moulding stations, particularly preferably between 8 and 80 blow moulding stations, advantageously between 8 and 40 blow moulding stations.

In a further advantageous embodiment the transfer (or coupling respectively) of the reduction of the pneumatic medium within the at least one blow mould is carried out in (or with respectively) the increase of the pressure of the pneumatic medium in the at least one further blow mould by means of a pressure supply device.

A pressure supply device preferably is or can be respectively coupled to a pressure extraction device by means of an energy conversion device. Advantageously the energy conversion device is suitable and/or provided in order to increase the pressure of the pneumatic medium located in at least a section of the pressure supply device and (at the same time or with a time delay) to reduce the pressure of the pneumatic medium located at least in a section of the pressure extraction device. The energy conversion device is likewise preferably arranged on the carrier (on which the plurality of blow moulding stations are also arranged). However, the energy conversion device can also be arranged on the stationary part of the system.

This is advantageously a central energy conversion device. This energy conversion device is preferably capable of operating several blow moulding stations (in particular one after the other). Thus 2-8 blow moulding stations can be operated with one energy conversion device. Therefore precisely one energy conversion device is provided as a pressure generating unit. For very large machine or transforming devices respectively it may be necessary to accommodate several energy conversion devices on the machine or transforming device respectively. Therefore preferably between one and ten pressure generating units, particularly preferably between one and three and in particular preferably two pressure generating units (or in each case energy conversion devices respectively) are provided and advantageously also arranged on the carrier or particularly advantageously on the stationary part of the system.

However, a decentralised high pressure supply would also be conceivable, in which each blow moulding station has its own energy conversion device, for example provided by a compression cylinder and a crank mechanism coupled thereto.

The blow moulding stations or blow moulds respectively associated with the energy conversion device can preferably be coupled individually to the energy conversion device. Therefore a blow moulding station or blow mould respectively can preferably be coupled by means of the pressure extraction device and a further blow moulding station can preferably be coupled by means of the pressure supply device to the energy conversion device.

Preferably a blow mould, after termination of a high pressure phase or in which after an expansion operation pneumatic medium is to be extracted respectively, can be fluidically coupled to an energy conversion device. Particularly preferably this energy conversion device can be fluidically coupled to a further connection on a blow mould, in which a plastics material preform to be expanded is located or in which a plastics material preform is located in a preliminary blow moulding phase respectively.

Preferably a permanent high pressure reservoir, which supplies the high-pressure medium necessary for transforming the preforms, is no longer necessary or provided respectively. The pneumatic high-pressure medium necessary for a specific number of transforming operations can preferably be generated immediately before (or in fact at the same time as) a transforming operation of the energy conversion device. Particularly preferably, substantially precisely the volume which is required here as a minimum is generated.

In this case it has proved advantageous that because of the central supply fewer high pressure generating devices are necessary. Up to 16 blow moulding stations can preferably be operated per energy conversion device.

The energy conversion device preferably has a chamber and particularly preferably two chambers, of which preferably one and advantageously both can be used as a temporary pneumatic high pressure reservoir. A flow connection between a chamber and the pressure supply device and/or the pressure extraction device can preferably be produced. A flow connection between the other chamber and the pressure supply device and/or the pressure extraction device can preferably be produced. Particularly preferably the maximum capacity in the case of two chambers is the same.

In a further advantageously embodiment the energy conversion device has two compression cylinders, in particular pneumatic cylinders, which are advantageously coupled to one another. Particularly advantageously the energy conversion device is capable of and suitable for supplying several blow moulding stations of the system with pneumatic medium under pressure.

In a further advantageous embodiment the coupling of the two compression cylinders to the system or to the carrier or to the blow moulding wheel respectively takes place (in each case) without vibration. Particularly advantageously the two compression cylinders are mechanically coupled.

Thus particularly preferably the spring unit described above (as energy store) is replaced by a second compression cylinder. In this case two blow moulding stations, of which one has already finished the preliminary blow moulding operation and the other is at the end of the high pressure phase, are advantageously simultaneously connected (fluidically) to the energy conversion device, and in these two blow moulding stations pressure is simultaneously built up or reduced. Since with such a design the final blow moulding time also determines the time of the pressure reduction and nevertheless the entire process angle should be used for cooling the bottle, the bottle is preferably still kept at a low pressure level until the final venting.

With such a system according to the invention, by comparison with the prior art no production of a potential energy store by pretensioning and therefore no change thereto is necessary. Moreover, as already mentioned, because of the central supply fewer pressure generating or energy conversion units respectively are necessary, since preferably up to 16 blow moulding stations can be operated per unit.

Thus in this embodiment the energy conversion device fulfils the function of an energy rocker. In this case with the application of comparatively little energy the compression of a given pneumatic medium can be achieved, assisted or driven respectively by the energy released in the pressure reduction.

The two compression cylinders, in particular the two piston rods of the compression cylinders, are preferably connected to one another (mechanically) by means of a (preferably drivable or controllable respectively) flywheel or an oscillating weight respectively.

The two compression cylinders are preferably coupled by means of a hydraulic cylinder, particularly preferably by means of a synchronising cylinder, which has a piston rod on both sides of the piston surface. Particularly preferably the hydraulic cylinder has a fillable chamber for stroke adjustment. Advantageously by means of the hydraulic cylinder it is possible to implement not only an intermediate energy storage device, which stores energy in the form of kinetic energy in the hydraulic medium, but also or instead of this a hydraulic drive for the two compression cylinders (or pistons thereof respectively).

Alternatively it is also possible for the energy conversion device to have only one compression cylinder which, however, has two chambers which can be filled with pneumatic medium. This is preferably a synchronising cylinder. Here too a stroke adjustment is particularly preferably possible, advantageously by means of an adjustable spacing of two piston surfaces. These two piston surfaces are preferably connected mechanically (rigidly) to one another. Moreover, such an energy conversion device preferably has two hydraulic cylinders which are both in each case coupled mechanically to the compression cylinder. In this case one hydraulic cylinder is preferably connected to the compression cylinder and the compression cylinder is mechanically coupled on the other side to the second hydraulic cylinder. Particularly preferably at least one hydraulic cylinder and advantageously both hydraulic cylinders can be used for a hydraulic drive of the compression cylinder and/or as part of the intermediate energy storage device for storing kinematic energy in the hydraulic medium. In a further advantageous embodiment the system has a driving device for driving the energy conversion device. Such a driving device can for example drive the said hydraulic cylinders. In particular a driving device may be an electric motor.

Preferably by a particularly advantageous configuration of the system according to the invention with a driving device which has a constant output power, nevertheless a variable stroke volume of pneumatic high-pressure medium can be produced. This can take place for example by a stroke adjustment through a variable chamber volume of either at least one compression cylinder or at least one hydraulic cylinder.

In a further advantageous embodiment an increase in the potential energy or the pressure of the pneumatic medium respectively can take place substantially adiabatically.

In a further advantageous embodiment the dead space volumes of all blow moulding stations are the same. The dead space volume describes the proportion of pneumatic high-pressure medium which is not used directly for the transforming process. The pressure supply device and/or the pressure extraction device preferably has a radially symmetrical air channel arrangement. Particularly preferably in each case all fluid communication lengths between the energy conversion device and the individual blow moulding stations are the same.

A dead space volume can be connected preferably to at least one blow moulding station, particularly preferably to all blow moulding stations. If a radially symmetrical air channel arrangement is not possible, it would also be conceivable for the path or the fluid communication paths respectively to be lengthened artificially via (conduit) loops and so to make all fluid communication paths or conduits respectively the same length. This is best implemented so that the pressure losses are identical. This is suitable particularly in the case of small containers, in which the volume is thus artificially increased and so the compression ratio is kept constant.

Alternatively or in addition an adaptation to different types of container or bottle sizes respectively can take place by means of a mechanical alteration of the stroke, for example by the use of different connecting rods and crank discs such as a stroke adjustment by means of the crank diameter. A stroke adjustment is preferably implemented by the adjustment of a variable chamber volume of a compression cylinder and/or of a hydraulic cylinder, as described above.

Alternatively or in addition an adaptation to a different container volume can take place by an independent adjustment of the preliminary blow moulding pressure in the container and/or in the compression cylinder or in at least one blow moulding station respectively and preferably in all blow moulding stations. An adaptation to different types of container or bottle sizes respectively is preferably also achieved alternatively or additionally by means of a variation of the pretensioning force (at least of one compression cylinder and preferably of several compression cylinders).

A control device preferably provided and suitable for (fluidically) connecting the energy conversion device by means of the pressure supply device or by means of a distributor star to a blow moulding station respectively, preferably by the control of valves, inside which is located a plastics material preform which has already been subjected to preliminary blow moulding. This container is acted upon with pressure (wherein the pneumatic high-pressure medium originates from the energy conversion device) and the energy conversion device is then uncoupled again from this blow moulding station by the control device. Then the control device connects the energy conversion device to the blow moulding station which has already been in the high pressure phase for the longest time, and reduces the pressure there again. In the case of several additionally present energy conversion devices, the control device now does not connect the above-mentioned energy conversion device to the blow moulding station directly thereafter (relative to the transport path or process step respectively) in the preliminary blow moulding phase for acting upon with pneumatic high-pressure medium, but to the corresponding blow moulding station which at this time is located as the last blow moulding station before the high pressure blow moulding stations.

In a further preferred embodiment the system has a control device for controlling valves of preferably the pressure supply device and/or the pressure extraction device and/or the energy conversion device. In this case the control device is preferably suitable for fluidically connecting a first blow mould, within which the pressure of a pneumatic medium is to be reduced, to the energy conversion device. Moreover the control device is preferably suitable for, simultaneously with or following a fluidic connection of the energy conversion device to the said first blow mould, connecting the energy conversion device fluidically to a further blow mould, inside which the pressure of a pneumatic medium is to be increased or should be increased respectively, preferably in order in this way to act upon a plastics material preform herewith and particularly preferably to thereby inflate it to form a plastics material container.

Therefore, depending upon the number of blow moulding stations which are in the high pressure phase, and depending upon the number of energy conversion devices, the control device can in each case alternately connect a blow moulding station fluidically to the energy conversion device which after the preliminary blow moulding is to be provided with pneumatic high-pressure medium, and a blow moulding station in which the pneumatic high-pressure medium can be extracted after termination of the high pressure phase.

The drive preferably takes place by changing the preload pressure, since as described above for example the pressure level is varied in the forward and return stroke. In this case a drive can advantageously take place both pneumatically and also hydraulically. An (additional) electrical drive on the oscillating weight is advantageously provided only for keeping the end positions, but can also be used as an auxiliary drive or as a main drive. Preferably during the high pressure blow moulding phase the compression piston is driven both by an electric motor and also from the energy store of the compressed air cushion.

In a further advantageous embodiment, at least intermittently during the reduction of the pressure of a pneumatic medium a part of the energy released during a pressure reduction of a pneumatic medium can be used for increasing the pressure of a pneumatic medium and a further part thereof can be stored intermediately. This preferably takes place at the start of the compression operation. Provision or extraction respectively of the intermediately stored energy preferably takes place (in particular automatically) at least intermittently and at least partially close to the end of the compression operation.

The intermediately storage of energy preferably takes place in the kinetic energy of a very large mass (such as for example an oscillating weight).

From the prior art it has proved disadvantageous that with a defined stroke and a fixed piston surface the displacement volume of a compression cylinder is constant. However, since the dead space contributes to an increase in the energy consumption, this should be as small as possible. However, with a small dead space and constant displacement volume the final blow moulding pressure changes with the container size (volume) and it is difficult to design an efficient machine which can preferably blow mould containers from 0.3 liters to 3 liters.

Therefore in a further advantageous embodiment the compression piston surface of the at least one (preferably all) compression cylinders (preferably for adiabatic high pressure generation) has on at least one side an active surface of which the surface area can be changed. This is preferably the side which is or can be respectively filled with the pneumatic medium to be compressed. Moreover, it would be conceivable for both sides of the piston surface to have variable (adjustable) active surfaces. In this case the area of the piston surface which during compression of the compression cylinder actually also contributes to the compression or effects it respectively is designate as an active surface. Alternatively it would likewise be conceivable to use several pistons.

A change to an active surface or a multi-surface piston respectively can preferably be achieved in that different regions of the piston surface (piston part-surfaces) on one side of the cylinder (preferably on the side on which the compression of the pneumatic medium takes place) form with the inner wall of the cylinder (cylinder housing) separate part-chambers, i.e. fluidically separated from one another. Thus a fluid medium can be introduced and compressed in these part-chambers individually or independently of one another respectively. However it is also possible for only one part-chamber or only a part of the part-chambers respectively to be provided with a fluid medium during a compression operation of the compression cylinder. The remaining part-chambers are then preferably ventilated atmospherically. Therefore in a preferred embodiment the part-chambers corresponding to the particular piston surfaces are ventilated (atmospherically) independently of one another. Moreover it is preferably possible for a plurality of part-chambers to be connected fluidically to one another. Thus even from a small number of separate part-chambers a plurality of interconnection options are advantageously created by the various combinations.

This preferably relates to a compression cylinder for adiabatic high pressure generation. In this case the piston of the cylinder is advantageously characterised by the presence of several simultaneously acting piston surfaces of a different or the same size. These can be interconnected in different ways depending upon the available container size. In this way the same piston stroke volumes of different sizes can be supplied with sufficient pressure. If for example in the case of small containers piston surfaces are not used, then these are ventilated atmospherically and do not build up any pressure. Thus in the case of a piston with for example two piston surfaces three different interconnection options exist (surface 1 or surface 2 or surface 1+surface 2). Furthermore the possibility preferably exists of pretensioning a rear side of a piston with pressure, so that a store of potential energy is created.

Advantages of such a configuration are that it enables high pressure generation which is optimised in terms of energy. With the aid of the interconnection of the piston surfaces different volumes of air (or volumes of pneumatic medium respectively) can be generated with the same piston stroke and thus for driving the system a driving device can be used which is not variable in its stroke.

In a further advantageous embodiment the compression piston surface of the compression piston of the at least one (preferably all) compression cylinders has an annular surface which can be acted upon and/or at least one circular surface which can be acted upon.

A piston surface preferably has (on at least one side) (at least) two, particularly preferably at least three and in particular preferably four piston part-surfaces, with which in each case a part-chamber is associated which can be separately supplied with fluid medium.

Preferably at least one piston part-surface is designed as an annular surface, and particularly preferably two piston part-surfaces are designed as annular surfaces. At least one piston part-surface, particularly preferably precisely one piston part-surface is advantageously designed as a circular surface. With respect to an axis which extends centrally through the piston rod parallel to the direction of movement thereof, the piston part-surface in the form of a circular surface is preferably located directly on this axis and one (or more) piston surfaces in the form of circular surfaces are arranged further out with a spacing with respect to this axis.

Furthermore it is possible that the cylinder housing or the cylinder casing respectively, which also in conjunction with the piston surface delimits the individual part-chambers from one another, is configured in such a way that it has a convex shaped portion. This can for example have the shape of a punch and can protrude into or engage in the piston respectively.

The piston can preferably also have on its compression side (on which its piston rod is not located) an annular opening which has a smaller diameter than the internal diameter of the cylinder In addition to or as an alternative to the above-mentioned characterising features the present invention is directed to a system for transforming plastics material preforms into plastics material containers which has a plurality of blow moulding stations which are arranged on a carrier and in each case comprise a blow mould for expanding plastics material preforms into plastics material containers inside this blow mould by means of a pressurised pneumatic medium which is supplied to the respective blow moulding station via a pressure supply device and is at least partially extracted again from the respective blow moulding station after the expansion operation via a pressure extraction device, wherein the system has at least one compression cylinder of which the compression piston has a compression piston surface which on at least one side has an active surface of which the surface area can be changed.

In this case this system can also be provided with at least one, several or all of the features already described above. The applicant reserves the right also to claim protection for this invention in the context of a divisional application.

Furthermore the present invention is directed to a method for transforming plastics material preforms into plastics material containers inside a blow mould by means of a pressurised pneumatic medium. In this case inside at least one first blow mould of a blow moulding station a plastics material preform is acted upon with pressurised pneumatic medium provided by means of a pressure supply device, and is expanded to form a plastics material container. After the expansion operation the pneumatic medium is at least partially extracted from the blow mould by means of a pressure extraction device.

According to the invention at least part of the potential energy stored in an energy store is extracted therefrom and converted by an energy conversion device into an increase in the potential energy of a pneumatic medium associated with at least one, preferably precisely one (further) blow moulding station. In this case at least a part of the energy transferred from the energy conversion device is stored intermediately in the form of kinetic energy in an intermediate energy storage device, and with the resulting pneumatic medium with increased potential energy preferably at least one, preferably precisely one, plastics material preform is preferably expanded in a blow mould of the at least one, preferably precisely one, further blow moulding station in order to form a plastics material container.

Potential energy is preferably extracted from an energy store by the energy conversion device, whilst pneumatic medium located in a blow moulding station after an expansion operation is expanded.

Alternatively or in addition it is also possible that means for pretensioning a piston of a compression cylinder are provided as an energy store for potential energy in the energy conversion device and energy is extracted from said means.

A proportion of the extracted energy is preferably converted into kinetic energy and stored in the intermediate energy storage device and at the same time another proportion, preferably the other part, of the extracted energy is used for increasing the potential energy of the pneumatic medium.

The proportion of energy stored in the intermediate energy storage device can preferably be used, particularly preferably towards the end of such a transformation operation, likewise in an increase of the potential energy of the pneumatic medium.

This operation can preferably also run in reverse, that is to say that then a part of the potential energy of a pneumatic medium is converted into kinetic energy in the intermediate energy storage device and a further part is converted into an increase in the potentially energy of the energy store.

A pressure reduction is preferably converted into a pressure increase of a predetermined volume of a further pneumatic medium at a predetermined (lower) pressure, such as for example the preliminary blow moulding pressure, wherein the volume of pneumatic high-pressure medium achieved in this way is (precisely) sufficient for at least, preferably for precisely, a further expansion operation of a further plastics material preform to form a plastics material container.

A reduction of the pressure of the pneumatic medium within at least one first blow mould is preferably coupled to the increase in the pressure of a pneumatic medium, preferably directly and particularly preferably simultaneously, but advantageously with a time delay. The pneumatic medium, the pressure of which has been increased, is preferably delivered to a plastics material preform and particularly preferably this plastics material preform is expanded to form a plastics material container.

Energy from the energy storage device is preferably used in order to increase the pressure of a pneumatic medium which is then used particularly preferably to act upon a plastics material preform therewith and/or to expand the plastics material preform. The energy is preferably converted into the kinematic energy of an oscillating weight. The energy conversion device and/or the said oscillating weight can preferably be driven by means of a driving device.

As a function of the phase or of the state respectively of at least one blow mould, preferably as a function of the phases or the states respectively of at least two blow moulds, a control device can preferably make a selection as to whether energy which is extracted during the reduction of the pressure of the pneumatic medium inside at least a first blow mould should be stored intermediately in an energy storage device or whether this energy should be used simultaneously with the extraction of the energy in order to increase the pressure of a (further) pneumatic medium.

In this case a phase or a state respectively of a blow mould is preferably understood to mean the phase or the state respectively of a plastics material or of a plastics material container which is located in this blow mould. Such a phase or such a state respectively can for example be a preliminary blow moulding phase, a high pressure phase, a low pressure phase or the start or a (successful) termination thereof respectively.

Preferably a fluid communication can also be produced between in each case two or preferably more blow moulds, so that then a reduction of the pressure of the pneumatic medium inside these two or preferably more first blow moulds can be converted into an increase of the pressure of the pneumatic medium within the two or more further blow moulds.

Particularly preferably the direct coupling of a compression operation and a decompression operation of pneumatic medium takes place by means of two mechanically coupled compression cylinders of the energy conversion device.

The stroke of at least one compression cylinder of the energy conversion device can preferably be adjusted. This takes place particularly preferably by changing of a chamber volume.

An increase in the pressure of the pneumatic medium can preferably take place substantially adiabatically. The dead space volume of at least one, preferably all, of the blow moulding stations, is preferably variable, particularly preferably by connection of an additionally dead space volume.

This method can also be provided with all of the features already described above.

In the production of PET bottles, during the process of creating the bottle a specific pressure sequence is run through in a resulting bottle. Attempts are made here to build up the individual different pressures as quickly as possible in the bottle. In this case it is important to reach the final blow moulding pressure as quickly as possible and to let it remain in the bottle for a long time, since in this phase the quality of the bottle can be definitely achieved. After the final blow moulding pressure phase the air is let out of the bottle again and is partially reused by means of recycling systems. This sequence should also be carried out as quickly as possible, since it also influences the final blow moulding angle and thus the duration of the final blow moulding pressure phase. Finally a quantity of air is guided out of the bottle over a sound absorber which at present can be recycled, if at all, only rarely and expensively.

In addition to or as an alternative to the above-mentioned characterising features the present invention is directed to a system for transforming plastics material preforms into plastics material containers which has a plurality of blow moulding stations which are arranged on a carrier and in each case comprise a blow mould for expanding plastics material preforms into plastics material containers inside this blow mould by means of a pressurised pneumatic medium which is supplied to the respective blow moulding station via a pressure supply device and is at least partially extracted again from the respective blow moulding station after the expansion operation via a pressure extraction device, wherein the system has at least one, preferably precisely one, compression cylinder, with the aid of which at least a part of the pneumatic medium delivered to it, preferably from the pressure extraction device, by means of at least one intermediate stage, in which the delivered pneumatic medium has already been compressed a first time to an intermediate pressure level, can be compressed to a pneumatic high-pressure medium.

In this case this system can also be provided with at least one, several or all of the features already described above. The applicant reserves the right also to claim protection for this invention in the context of a divisional application.

Alternatively or in addition the system has at least one, preferably precisely one, compression cylinder, which has at least four, preferably precisely four, piston surfaces of different sizes.

It is also conceivable that at least a part of the pneumatic medium located in a blow moulding station after an expansion operation is extracted by means of the pressure extraction device into an intermediate pressure reservoir of reduced pressure (for example in a range between 5 and 20 bar). Starting from this, then either pneumatic medium from the intermediate pressure reservoir and/or pneumatic medium from a blow moulding station can be delivered to the compression cylinder for compression.

The compression cylinder preferably compresses at least a part of the pneumatic medium delivered to it from the pressure extraction device at least twice. Therefore a multi-stage compression, particularly preferably a two-stage compression or advantageously a three-stage compression of the pneumatic medium preferably takes place. Such pressure transformation over several stages (proceeding substantially as adiabatically as possible) makes possible an even better proximity to an ideal adiabatically proceeding compression of a pneumatic medium.

Although implementation of the multi-stage compression or the achievement of a high pressure level respectively by means of at least one or preferably several intermediate pressure levels by means of one single compression cylinder is described, however in principle implementation by means of several, for example by means of two, compression cylinders is also conceivable.

The compression cylinder is likewise preferably arranged on the carrier, and particularly preferably is a pneumatic cylinder.

The compression cylinder preferably has at least four, preferably precisely four, particularly preferably six or advantageously eight chambers. In this case at least three, preferably four and particularly preferably all piston surfaces advantageously have different surface areas.

In this case the piston surfaces of all chambers are preferably connected mechanically by (precisely) one piston rod. At least one piston surface, particularly preferably all piston surfaces are preferably configured as annular surfaces. The piston rod can preferably be driven, particularly preferably by an electric motor.

During a piston return stroke the volume of half of the chambers is preferably reduced, whereas the volume of the other chambers is increased. The reverse preferably applies in the case of a piston forward stroke.

Pneumatic medium to be compressed in a first chamber can be delivered to the compression cylinder. This chamber preferably has the greatest piston surface. This first chamber can advantageously be both fluidically connected to and also separated from a second chamber, wherein this fluid communication can be connectable or closable or produced or closed respectively as a function of the piston position or particularly advantageously as a function of the direction of movement of the piston rod. This second chamber preferably has a smaller piston surface than that of the first chamber In this case this piston surface can be reduced to a range between 10% and 90%, preferably between 10% and 75% and particularly preferably between 10% and 50%, of the piston surface of the first chamber.

The second chamber of the compression cylinder can preferably be brought into a fluid communication with a third chamber of the compression cylinder, wherein such a fluid communication is likewise advantageously connectable or closable or produced or closed respectively as a function of the piston position or particularly advantageously as a function of the direction of movement of the piston rod. Moreover, a non-return valve is advantageously provided in this fluid communication. The piston surface in the third chamber is preferably smaller than that of the first chamber and particularly preferably the same size as or advantageously smaller than that of the second chamber.

The third chamber of the compression cylinder can preferably be brought into a fluid communication with a fourth chamber of the compression cylinder, wherein such a fluid communication is likewise advantageously connectable or closable or produced or closed respectively as a function of the piston position or particularly advantageously as a function of the direction of movement of the piston rod. The piston surface of the fourth chamber preferably has a smaller surface than that of the first chamber, preferably smaller than that of the second chamber and particularly preferably smaller than that of the third chamber. Thus the piston surface of the fourth chamber is advantageously designed to be the smallest. The maximum chamber volume of the fourth chamber is preferably likewise the smallest. The maximum chamber volume of the first chamber is particularly preferably the greatest.

The fourth chamber preferably has a removal point, from which the pneumatic medium located therein can be extracted. A backflow of pneumatic medium (by means of the removal point) into the fourth chamber is particularly preferably prevented by means of a valve, in particular a non-return valve. It would also be conceivable that for example not only pneumatic medium from the second chamber can be delivered to the third chamber, but that additional pneumatic medium (for example of a medium pressure level) could also be delivered thereto.

A fluid communication between two chambers arranged adjacent in a compression cylinder is preferably guided through the piston (or the piston rod).

In the case of four chambers, in a piston return stroke the volume of the first and the third chambers is increased, whereas the volume in the other two chambers, that is to say the second and fourth chambers, is reduced. Conversely and preferably, in a piston forward stroke the volume of the first and the third chambers is reduced, whereas the volume in the other two chambers, that is to say the second and fourth chambers, is increased.

The compression cylinder is preferably connected to a high pressure reservoir, to which compressed pneumatic medium generated by the compression cylinder can preferably be delivered.

In a piston return stroke of the compression cylinder the fluid communication between the first chamber and the second chamber as well as between the third chamber and the fourth chamber is preferably closed. Particularly preferably in a piston forward stroke of the compression cylinder the fluid communication between the first chamber and the second chamber as well as between the third chamber and the fourth chamber is preferably produced. Advantageously a delivery of pneumatic medium into the first chamber of the compression cylinder is only possible during a piston return stroke.

In a first stage in a working operation of the compression cylinder a fluid communication preferably exists between the first chamber of the compression cylinder and a delivery of pneumatic medium such as for example the pressure extraction device. Preferably in a first step of the first stage the piston first of all moves back, so that the first chamber volume is increased and medium flows into the first chamber by means of the delivery of pneumatic medium. In this case fluid communications between the first chamber and the second chamber are closed. At the end of the first step of the first stage the delivery is ended or closed respectively.

At the start of the second step of the first stage a fluid communication between the first chamber and the second chamber (and particularly preferably also between the third chamber and the fourth chamber) is produced. The second step of the first stage is provided by the piston forward stroke. At the end of the second step of the first stage the fluid communication between the first chamber and the second chamber (particularly preferably likewise between the third chamber and the fourth chamber) is disconnected.

At the start of the first step of the second stage a fluid communication between the second chamber and the third chamber is produced. Finally, the first step of the second stage is provided by a piston return stroke. As a result the pneumatic medium located in the second chamber is preferably pushed into the third chamber. At the end of the first step of the second stage the fluid communication between the second and the third chambers is disconnected.

At the start of the second step of the second stage a fluid communication between the third and fourth chambers is produced. The second step of the second stage is provided by a piston forward stroke. At the end of this step the fluid communication between the third and fourth chambers is disconnected again.

In a last step pneumatic medium located in the fourth chamber can now be extracted therefrom.

In this case the sequence just described relates to a specific volume of delivered pneumatic medium which is compressed first of all in the second chamber to an intermediate pressure level and ultimately is compressed in the fourth chamber to a final pressure level.

In a piston forward stroke or a piston return stroke respectively the said two stages can also be proceeded simultaneously, in each case then based on pneumatic medium which has been delivered in successive steps.

The present invention is additionally or alternatively directed to a method according to the preamble to claim 15. After the expansion operation at least a part of the pneumatic medium located in the blow mould is compressed by means of a multi-stage compression process, preferably by means of a two-stage compression process, preferably substantially adiabatically. The resulting compressed pneumatic medium is preferably used again for supplying a plastics material preform. However, it is also possible that before this use first of all pneumatic medium at this pressure is delivered to a reservoir for storage.

In this case this method can also be provided with at least one, several or all of the features already described above. The applicant reserves the right also to claim protection for this invention in the context of a divisional application.

Particularly preferably this relates to a two-stage and advantageously a three-stage compression process.

Furthermore the present invention is directed to a method for recycling a pneumatic medium used for transforming in a system for transforming plastics material preforms into plastics material containers inside a blow mould by means of a pressurised pneumatic medium. In this case inside at least one first blow mould of a blow moulding station a plastics material preform is acted upon with pressurised pneumatic medium provided by means of a pressure supply device, and is expanded to form a plastics material container. In this case at least a part of the medium preferably located in the blow mould after an expansion operation of a plastics material preform to form a plastics material container is decompressed to a lower first pressure level and this is at least partially compressed to a higher second pressure level. The resulting compressed pneumatic medium is preferably used for a processing operation of a further plastics material preform or plastics material container. Preferably at least a part of the pneumatic medium located in the blow mould after an expansion operation of a plastics material preform to form a plastics material container can be delivered to an intermediate pressure reservoir. Preferably a part of the compressed pneumatic medium and/or of the pneumatic medium used for the processing operation can be provided by an intermediate pressure reservoir.

In this case this method can also be provided with at least one, several or all of the features already described above. The applicant reserves the right also to claim protection for this invention in the context of a divisional application.

In a first preferred variant the method is directed to the recycling of a pneumatic medium used for transforming in a system for transforming plastics material preforms into plastics material containers inside a blow mould by means of a pressurised pneumatic medium. In this case inside at least one first blow mould of a blow moulding station a plastics material preform is acted upon with pressurised pneumatic medium provided by means of a pressure supply device, and is expanded to form a plastics material container.

After the expansion operation in a first stage at least a part of the medium located in the blow mould is initially decompressed to a first pressure level. Such a decompression is preferably achieved by the production of a fluid communication between the blow mould and a, preferably empty, chamber (of predetermined volume), for example a pressure tank. In this case "empty" is understood to mean the presence of atmospheric conditions, i.e. in particular a pressure of substantially 1 bar.

After the end of the decompression the fluid communication between the blow mould and the chamber is disconnected.

Then in a second step the pneumatic medium located in the chamber is compressed until a second pressure level is reached This compression preferably takes place with the aid of a compressor or compression cylinder respectively, which is particularly advantageously arranged on the carrier. The chamber in which the medium located in the blow mould is decompressed is particularly preferably a compression chamber of the compressor or of the compression cylinder.

Then in a third stage the pneumatic medium compressed to the second pressure level is either fed into a high pressure reservoir and/or delivered to a further blow mould, which is preferably an "empty" blow mould, preferably for acting upon supplying this medium to a plastics material preform.

If the pneumatic medium compressed to the second pressure level is diverted into a further blow mould, or the container located therein respectively, then preferably in a fourth stage additional pressurised pneumatic medium is delivered. Particularly preferably the volume of the additionally delivered pneumatic medium supplements the delivered volume of the pneumatic medium compressed to the second pressure level in such a way that the total volume is sufficient for a treatment step provided. This additional delivery of pneumatic medium is advantageous, in order to be able to compensate for any pressure losses or losses of pneumatic medium respectively.

In this case a treatment step can for example be a preliminary blow moulding of a plastics material preform or a transformation operation of a plastics material preform to form a plastics material container. Advantageously the second pressure level corresponds to the pressure of the additionally delivered pneumatic medium. The additional pressurised pneumatic medium is preferably produced by a high pressure compressor or a compression cylinder respectively. In this case this high pressure compressor is advantageously not arranged on the carrier but is preferably an external high pressure compressor. However, the high pressure compressor or compression cylinder respectively is particularly preferably already arranged on the carrier.

The first pressure level is preferably located in a range between 2 and 10 bar, particularly preferably in a range between 3 and 8 bar and advantageously between 4 and 6 bar. The second pressure level preferably lies in a range between 20 and 50 bar, preferably between 20 and 40 bar and particularly preferably between 30 and 40 bar. The second pressure level preferably corresponds to the pressure which is used for expansion of a plastics material preform to a plastics material container or alternatively for preliminary blow moulding of a plastics material preform.

In a preferred second embodiment of the method for recycling of a pneumatic medium used for transformation, instead of the fourth step of the first embodiment between the first stage (decompression) and the second stage (compressing the chamber), in which the pneumatic medium already recovered from the expansion is at a first pressure level, additional pneumatic medium, preferably at a greater pressure level or particularly preferably at the same pressure level, is delivered. Particularly preferably, the volume (or the material amount respectively) of delivered additional pneumatic medium is selected in such a way that, taking account of the pressure thereof and advantageously also taking account of the material amount (for example from volume, pressure) of the pneumatic medium recovered from the decompression and already located in the chamber, the total volume of pneumatic medium obtained after compression of the total volume of pneumatic medium to a second pressure level is sufficient for a treatment step of a plastics material preform. The pressure of the delivered pneumatic medium is preferably generated by means of a low pressure compressor. This may advantageously be an external low pressure compressor which is not arranged on the carrier, or preferably one which is arranged on the carrier.

In a preferred third embodiment of a method for recycling of a pneumatic medium used for transformation, before the first step, i.e. before a fluid communication is produced between the blow mould and the chamber for decompression of at least a part of the pneumatic medium located in the blow mould, first of all a fluid communication is produced between the blow mould and an intermediate pressure reservoir. A pressure between 5 and 40 bar, particularly preferably between 5 and 20 bar, advantageously between 12 and 18 bar, preferably prevails in the intermediate pressure reservoir. The pressure prevailing in the intermediate pressure reservoir is preferably in particular lower than that of the pneumatic medium which is used for transforming plastics material preforms or the pressure of the pneumatic medium respectively which, immediately after completion of a transformation operation of a plastics material preform to a plastics material container, prevails in the plastics material container.

Then the steps of the first embodiment are carried out for recycling a pneumatic medium used for transformation.

In a further preferred variant of this third variant the further blow mould (or container or preform respectively), to which in the third step of the method the pneumatic medium compressed to the second pressure level is delivered, is not an "empty" blow mould (or container or preform respectively), but this blow mould (or container or preform respectively) has already been acted upon in advance with pneumatic medium. This further blow mould has preferably already been acted upon in advance with pneumatic medium from the intermediate pressure reservoir. Thus a pressure between 5 and 40 bar, particularly preferably between 5 and 20 bar, advantageously between 12 and 18 bar, particularly preferably prevails in the intermediate pressure reservoir before pneumatic medium compressed to the second pressure level is delivered thereto. Then particularly preferably the material amount (or the volume respectively) of the pressurised pneumatic medium additionally delivered to the further blow mould is adapted appropriately. Compared with an "empty" blow mould, a correspondingly lesser material amount or a smaller volume respectively of additional pneumatic medium has to be delivered.

In a preferred fourth embodiment of a method for recycling a pneumatic medium used for transformation, the modifications described in the context of the second embodiment of the method are integrated into the third embodiment of the method.

With this method air, so-called "waste air", preferably from a blow mould and preferably with a pressure or internal bottle pressure respectively of less than 15 bar, can be recycled to high pressure. However, it is also possible to function completely without an intermediate pressure reservoir. For this purpose the "complete waste air" is removed from the bottle again and recompressed.

Thus an external compressor for high pressure air could preferably be omitted. In all variants of this method less air would be wasted.

Further advantages and embodiments are disclosed by the appended drawings. In the drawings:

FIG. 1 shows a schematically illustrated preferred embodiment of a system according to the invention for transforming plastics material preforms into plastic containers in plain view as well as two blow moulding stations in cross-section;

FIG. 2 a force/piston position diagram for a compression and decompression taking place in a compression cylinder;

FIGS. 3*a-d* four schematic cross-sectional representations of an energy conversion device of further preferred embodiments of a system according to the invention;

Figure 1:
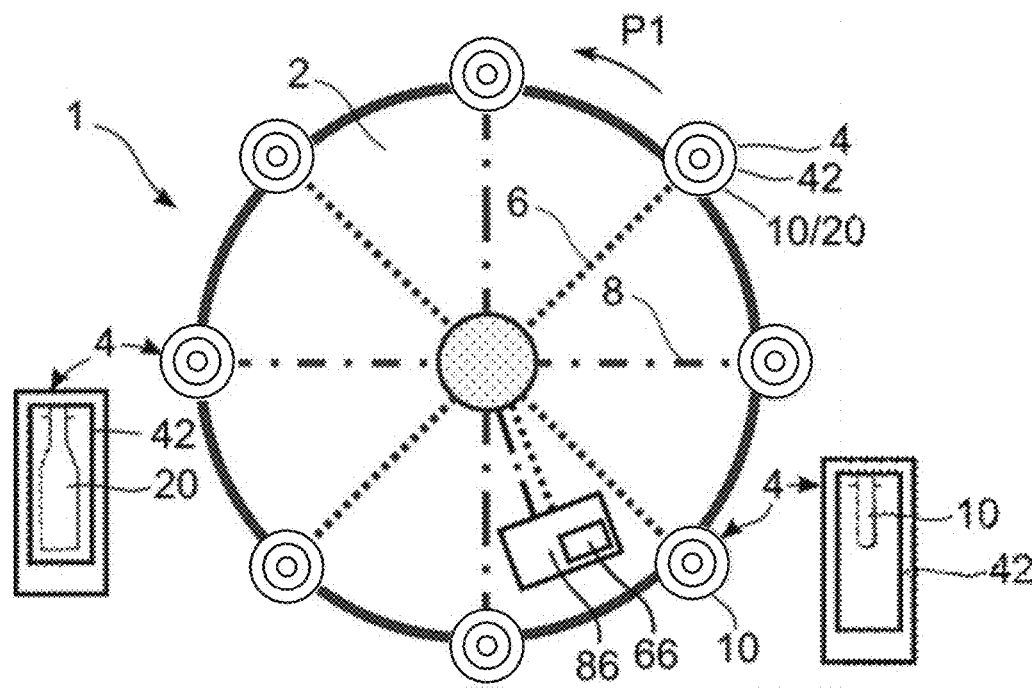

FIG. 1 shows a schematic representation of a preferred embodiment of a system according to the invention for transforming plastics material preforms into plastics material containers in plain view as well as two blow moulding stations in cross-section. In this case a plurality of blow moulding stations 4 is arranged on a carrier 2. Each blow moulding station 4 has a blow mould 42, inside which a plastics material preform 10 can be expanded into a plastics material container 20 by acting upon a pneumatic medium under pressure. The carrier 2 may preferably be a carrier which is rotatable (preferably about a vertical axis). Furthermore the system has at least one pressure supply device 6 or at least one pressure extraction device 8 respectively, by means of which the pneumatic medium can be supplied to the individual blow moulding stations 4 or extracted from the individual blow moulding stations 4 respectively. In this case the pressure extraction device 8 and the pressure supply device 6 are preferably not in fluid communication with one another. The pressure supply device and the pressure extraction device are preferably conduits.

Likewise two blow moulding stations 4 are illustrated schematically in cross-section In FIG. 1. This indicates the progress of a transforming operation. Thus a plastics material preform 10 is still located inside the blow mould 42 in the blow moulding station 4 illustrated on the right side if FIG. 1. By the introduction of pneumatic high-pressure medium this plastics material preform 10 is inflated to a finished moulded plastics material container 20. The pneumatic high-pressure medium which is necessary for this is supplied to the blow moulding station 4 by means of the pressure supply device 6. In the course of the expansion operation of the plastics material preform 10 to form a finished moulded plastics material container 20, in the illustrated embodiment the carrier turns further anticlockwise, so that after the end of the expansion operation the blow moulding station 4 can now be located at the point on the blow moulding station 4 adjacent to which the second cross-sectional representation of a blow moulding station 4 is shown (in the left side of the drawings). Then there is no longer any plastics material preform 10 in the associated blow mould 42, but instead the finished inflated plastics material container 20 is already located there.

The pneumatic medium which is located in the finished inflated plastics material container 20, and which even after the expansion operation still has a high pressure, can now be at least partially extracted by means of the pressure extraction device and can be used as an energy store for potential energy. For this purpose the blow moulding station 4 can be connected by means of the pressure extraction device 8 to the energy conversion device 86. The energy conversion device 86 is provided and is suitable respectively for turning the energy extracted from the potential energy store into an increase in the pressure of a pneumatic medium, by which either simultaneously or subsequently thereto a plastics material preform 10 is expanded into a plastics material container 20 in a further blow moulding station 4. In this case a temporary excess of extracted energy can be stored intermediately in the form of kinetic energy in an intermediate energy storage device 66 and at a later time this energy can be likewise supplied to the compression operation.

Figure 2:
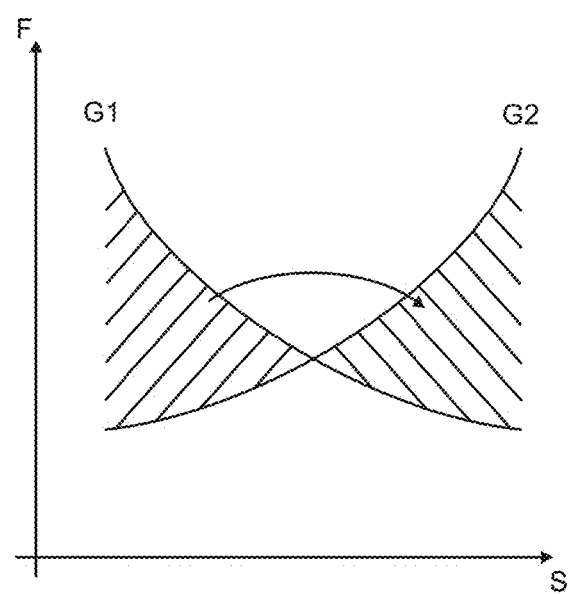

In FIG. 2, with reference to a qualitative diagram, the force F occurring on or to be applied respectively to a piston of a compression cylinder is shown depending from the piston position s in the event of an expansion, characterised by the reference G1, and in the event of a compression of a pneumatic medium, characterised by the reference G2. During an expansion operation the released force decreases as the volume increases. The behaviour is reversed in a compression operation, wherein the force to be applied increases with the compression path. Therefore in the event of a coupling of a pressurising operation and a compression operation initially an excess force is obtained from the force released in the compression. The system 1 according to the invention is suitable for intermediate storage of is the unused energy associated with this excess force and produced in the event of a "simple" coupling, which is marked in FIG. 2 as a cross-hatched area, in the intermediate energy storage device 66 and to reuse it at the end of the compression operation and to deliver it from the intermediate energy storage device 66 to the compression piston.

FIGS. 3*a-d* show four schematic cross-sectional representations of an energy conversion device 86 of further preferred embodiments of a system 1 according to the invention. In the embodiment shown in FIG. 3*a* the energy conversion device 86 has two compression cylinders 7 which are each coupled mechanically by means of their cylinders to a crank mechanism. An oscillating weight 12, in which energy can be stored intermediately in the form of kinetic energy, is provided here as intermediate energy storage device 66. The oscillating weight 12 can be driven by means of a driving device 122. The reference S1 in each case indicates in the compression cylinders 7 the compression side, that is to say the chamber of the compression cylinder 7 in which in this embodiment of the present invention pneumatic medium is introduced and compressed. In this case compression does not take place simultaneously on both compression sides of the two compression cylinders, but pneumatic medium is introduced at high pressure into one compression cylinder, for example by producing a fluid communication with a blow moulding station, in which the transformation operation from a plastics material preform 10 to a plastics material container 20 has been ended. This compression chamber or this pneumatic medium respectively serves as an energy store of potential energy, from which energy can be extracted by the energy conversion device 86 by a reduction of the pressure. The chamber on the compression side S1 of the other compression cylinder is likewise filled with pneumatic medium which is, however, at a lower pressure. Part of the extracted energy is stored intermediately in kinetic energy of the oscillating weight 12 and the other part is converted directly into an increase in the pressure of the pneumatic medium in the other compression cylinder 7. In this case, already during the increase of the pressure or also immediately thereafter, the chamber in which the pressure of the pneumatic medium located therein is increased can be connected fluidically to a further blow moulding station or to the blow mould thereof respectively in which a plastics material preform 10 to be expanded is preferably located.

Figure 3A:
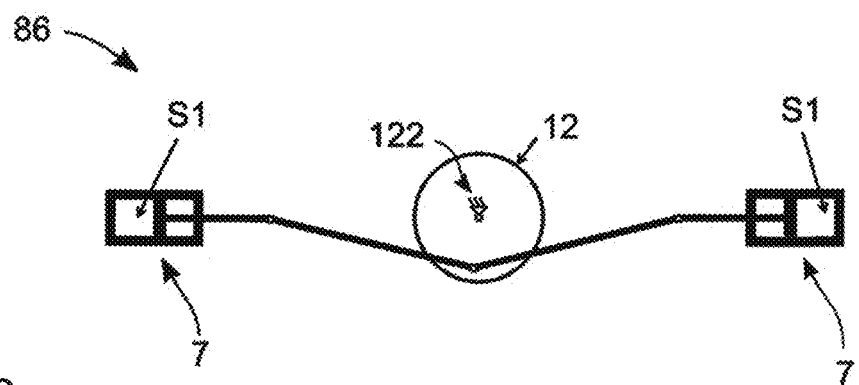
Figure 3B:
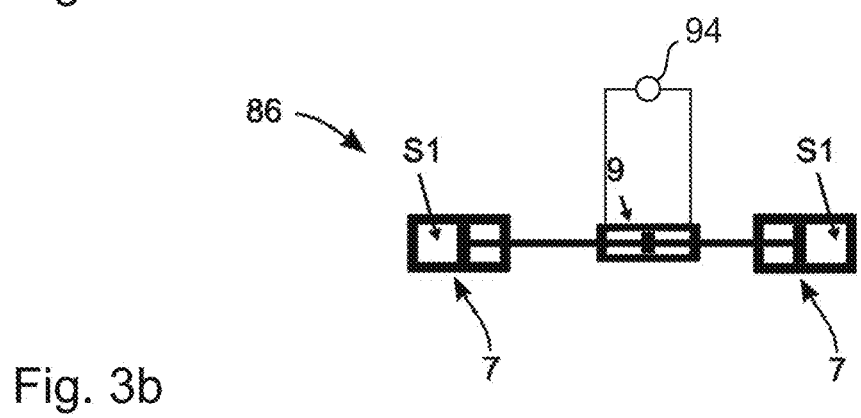

FIG. 3b shows an energy conversion device 86 in which, by comparison with FIG. 3a, the coupling of the two compression cylinders 7 does not take place by means of an oscillating weight 12, but by means of a hydraulic cylinder 9. An intermediate energy storage of kinetic energy can likewise take place, as illustrated here, by means of the storage of kinetic energy in a hydraulic medium. At the same time a hydraulic drive 94 of the energy conversion device 86 can likewise be implemented by means of the hydraulic cylinder 9.

Figure 3C:
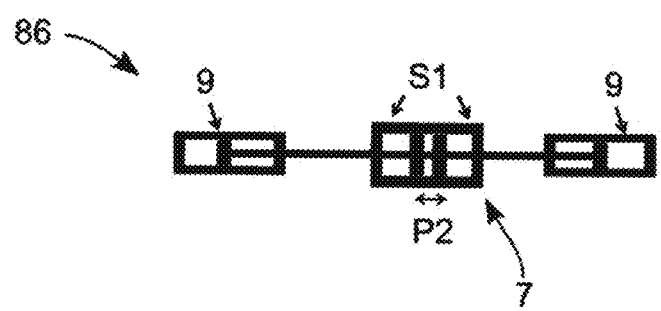
Figure 3D:
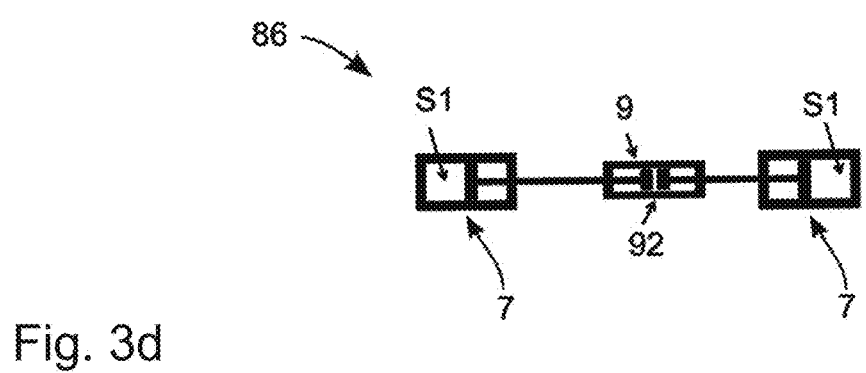

In the embodiment of an energy conversion device 86 illustrated in FIG. 3c only one compression cylinder is provided. This has two compression sides S1, wherein these two chambers can be spaced apart from one another by an adjustable distance (indicated by arrow P2). More precisely, the compression cylinder 7 has two pistons which are connected to one another (by means of a piston rod). The piston surfaces of these two pistons can be spaced apart from one another, as illustrated by the arrow P2. A stroke adjustment can be implemented by this adjustable spacing. When the spacing between the two piston surfaces is increased, the total volume of the two chambers (the compression sides S1) becomes correspondingly smaller. The intermediate energy storage device 86 can be implemented here over both hydraulic cylinders 9.

The compression cylinder illustrated in FIG. 3c can be driven in each case by the pistons of both compression sides by means of mechanical coupling to a respective hydraulic drive 9. However, it would also be conceivable for the compression cylinder to be driven by only one hydraulic drive 9.

Also in the embodiment of an energy conversion device 86 illustrated in FIG. 3b a stroke adjustment can be implemented in a similar manner to that shown in FIG. 3c. For this purpose a fillable chamber 92 is provided in the hydraulic cylinder 9 for stroke adjustment. In this case the two compression cylinders are no longer connected mechanically by means of one single piston rod, but each compression cylinder 7 is connected by a separate piston rod to the hydraulic cylinder 9. In the hydraulic cylinder 9 the piston surfaces thereof form two walls of the fillable chamber 92 for stroke adjustment.

Figure 4:
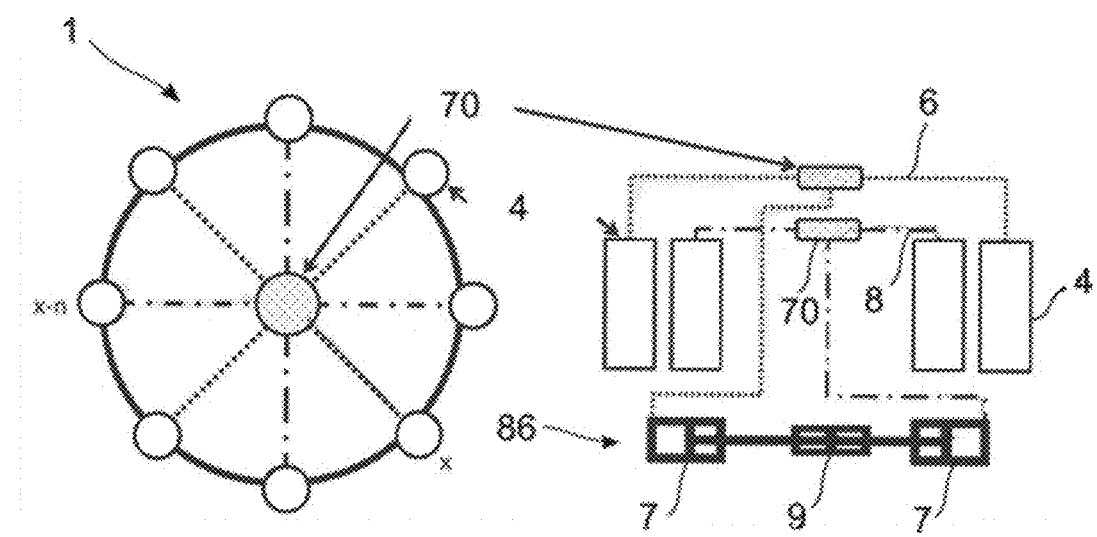
FIG. 4 shows a schematic representation of a further preferred embodiment of a system according to the invention in a plan view and in a cross-sectional representation.

FIG. 4 shows a schematic representation of a further preferred embodiment of a system 1 according to the invention in a plan view and in a cross-sectional representation; In this case in the right part of the drawing the mode of functioning of the system 1 according to the invention or an embodiment thereof respectively is illustrated using the example of four blow moulding stations 4. It is shown that, by means of the pressure supply device 6 via a distribution device 70, the two outer blow moulding stations 4 can be brought into fluid communication both with one another and also individually or with both blow moulding stations 4 together with the compression chamber of the left compression cylinder 7 of the energy conversion device 86. Analogously, by means of the pressure extraction device 8 via a further distribution device 70, the two inner blow moulding stations 4 can be brought into fluid communication both with one another and also individually or both together with the compression chamber of the right compression cylinder 7 of the energy conversion device 86.

If now in one of the inner blow moulds 42 just one transformation process of a plastics material preform 10 into a plastics material container by means of a pressurised pneumatic medium is concluded, then the greatest possible part of the potential energy located in this pneumatic medium should be used. In this respect it is provided that this energy is used directly for production of a volume of pneumatic medium (from a suitable volume of pneumatic medium at a lower pressure such as for example the so-called preliminary blow moulding pressure) at such a pressure that it is suitable in turn for transforming a plastics material preform 10 into a plastics material container 20. This is carried out by the energy conversion device 86. For this purpose the blow mould 42 is for example brought into fluid communication with a compression chamber (compression side S1) of a compression cylinder. With the assistance of an initial tension or another driving device the pneumatic medium in this compression chamber relaxes as the pressure thereof is reduced. Simultaneously the pressure of the pneumatic medium in the compression chamber of the second compression cylinder 7 is increased. In this case an initial excess force is first of all stored intermediately in the form of kinetic energy and is then returned to the compression operation.

FIG. 4 likewise shows that also in each case two blow moulding stations 4 or blow moulds 42 respectively can be fluidically coupled to one another. Thus in these two blow moulds 42 the pressure is simultaneously reduced and in two further blow moulds 42 the pressure of the pneumatic medium is simultaneously increased.

Figure 5:
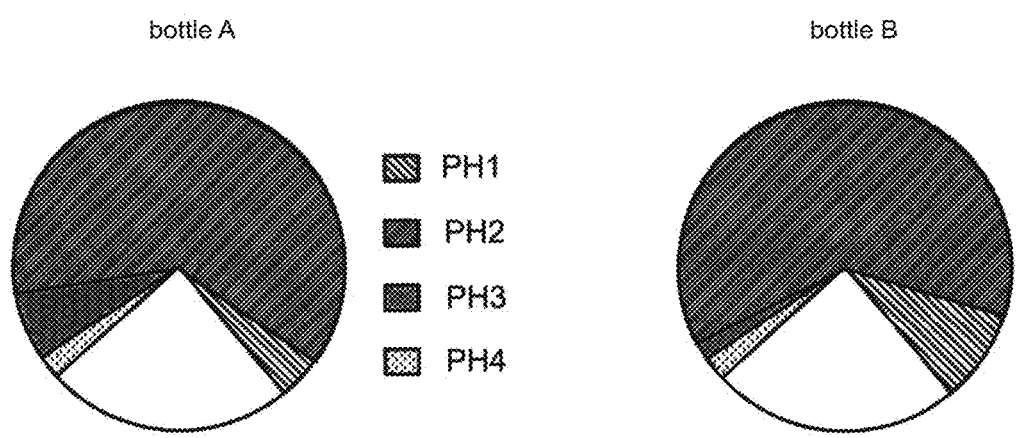
FIG. 5 shows a comparison of the process angle of the processing operations of two bottles in the shaping process.

FIG. 5 shows a comparison of the process angles of the processing operations of two bottles in the shaping process starting from a preform. In this case the circles each represent a cycle of the system 1 for transforming plastics material preforms 10 into plastics material containers 20 (cf. FIG. 1). A typical cycle begins in each case in the white circle segment for example with the introduction of a plastics material preform 10 into a blow mould 42 of a blow moulding station 4. The actual transformation operation of a plastics material preform 10 is preferably begun with a pre-blowing phase PH1 in which the plastics material preform 10 is acted upon with pneumatic medium at low pressure, the so-called preliminary blow moulding pressure. This is followed preferably by a high pressure phase PH2, in which the plastics material preforms 10 are inflated to form plastics material containers 20 by acting upon pneumatic medium under (high) pressure. This phase is preferably followed by a low pressure phase PH3, in which preferably at least a part of the pneumatic medium is extracted and is particularly preferably recycled. For example such a pressure reduction in a blow mould in such a phase can be converted into a pressure increase of the pneumatic medium of a further blow mould, as described above. A pressure relief phase PH4 then preferably follows, in which the rest of the pressure prevailing in the blow mould 4 or in the finished inflated plastics material container 20 respectively is relieved.

The high pressure phase preferably always uses a fixed process angle, i.e. the same time period. This is illustrated in FIG. 5 by equal-sized segments of the high pressure phase of the bottle A and B. This may be necessary in order to be able to ensure the quality standards on the shape of the plastics material container 20. For this purpose it is preferably important to achieve the final blow moulding pressure as quickly as possible and to let it remain in the bottle for a long time.

The process sequence illustrated in FIG. 5 for the bottle B shows a longer-lasting pre-blowing phase PH1 by comparison with the bottle A. Reasons for this may possibly be a different container to be expanded, for example a container having a smaller or larger volume. The white segment of the circle diagrams represents the so-called dead angle of the shaping process in the system 1. In this, no more transformations can be carried out on a plastics material preform 10 or on a plastics material container 20 respectively. As already mentioned, this time period represents for example the opening and/or closing of the blow mould 42 and/or the delivery of a plastics material preform 10 into the system 1 and/or the removal of the finished blown plastics material container 20 from the system. This time period is preferably substantially fixed with respect to its duration. It may now be preferable, in the case of a pre-blowing phase PH1 which starts early, to delay the pressure relief phase PH4 for as long as possible and thus, as illustrated in the case of the bottle A, to lengthen the low pressure phase PH3 by comparison with the bottle B.

In a preferred embodiment the pressure reduction inside a first blow mould 42, which is particularly preferably in the low pressure phase, is coupled at the same time to the pressure reduction of a pneumatic medium inside a further blow mould 42 which is preferably in the pre-blowing phase. Since with such a design the final blow moulding time of the first blow mould 42 also determines the time of the pressure reduction and nevertheless as far as possible the entire process angle should be used for cooling the bottle, the bottle is still kept at a low pressure level until the final venting.

Figure 6:
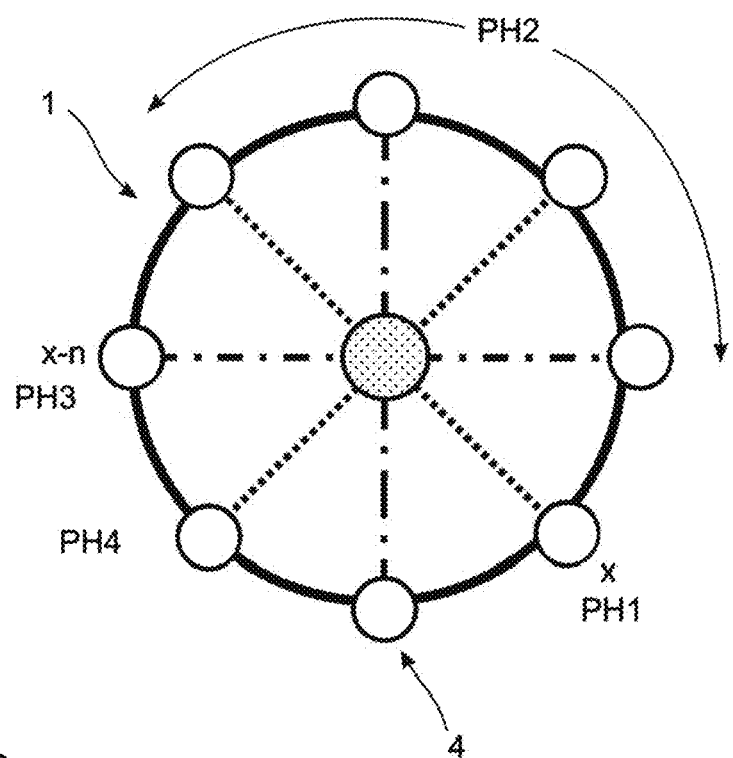
FIG. 6 shows a schematic representation of the embodiment illustrated in FIG. 1 of a system according to the invention, identifying the individual phases in which the plastics material containers are undergoing their transforming operation.

FIG. 6 shows a schematic representation of the embodiment illustrated in FIG. 1 of a system according to the invention, identifying the individual phases in which the plastics material containers are undergoing their transforming operation. The blow moulding station designated by x is still in the pre-blowing phase PH1, i.e. the plastics material preform 10 has already been acted upon with pneumatic medium at low pressure, the so-called preliminary blow moulding pressure. By acting upon pneumatic high-pressure medium, the plastics material preform 10 is inflated in the high pressure phase PH2 to form a plastics material container 20. Finally the pressure of the pneumatic medium is reduced, so that the blow moulding station 4 is in the low pressure phase PH3 (blow moulding station 4, designated by x-n). To conclude, the remaining pressure is reduced, which corresponds to the pressure relief phase PH4.

The energy conversion device 86 can now be coupled to the blow moulding station x by means of a distributor star as illustrated in FIG. 4 or by means of the pressure supply device 6 respectively, in order to act upon the container with pressure there and to decouple it again from the blow moulding station x and to associate the energy conversion device 86 with a blow moulding station x-n in order to reduce the pressure there again. In this case the number n is the number of blow moulding stations in the high pressure phase. Thus in the example illustrated in FIG. 6 n would be equal to 4. If m describes the number of energy conversion devices 86 of the system 1, then the above energy conversion device 86 is connected to the x+1*m-th blow moulding station 4 in which pressure is built up and finally the pressure is relieved in the x−n+1*m-th blow moulding station.

In an alternatively embodiment (for example use of a second compression cylinder 7) pressure can be simultaneously built up and relieved in the blow moulding stations x and x-n.

Figure 7:
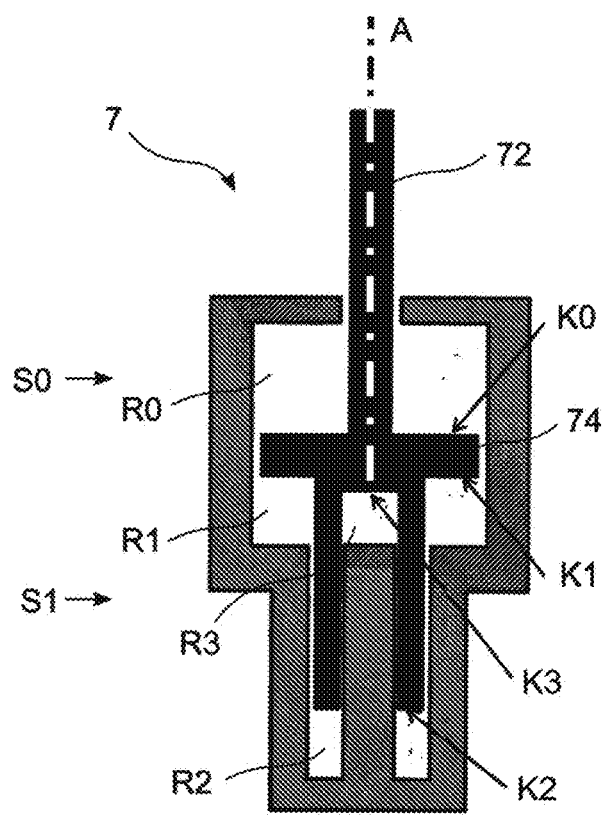
FIG. 7 shows a schematic cross-sectional representation of a compression cylinder of a further preferred embodiment of a system according to the invention.

FIG. 7 shows a schematic cross-sectional representation of a compression cylinder 7 of a further preferred embodiment of a system 1 according to the invention. In a compression cylinder 7 configured in this way the piston has a piston surface K0 for pretensioning. This is located on the pretensioning side S0. On the other side, the compression side S1, the piston surface is not in one piece but is subdivided into three piston part-surfaces K1-K3. This produces three separate part-chambers R1-R3, in which both individually and also in conjunction with one or both other part-chambers can be used for compression of a pneumatic medium. Moreover, the part-chambers R1-R3 can also be individually atmospherically ventilated.

An axis A is also shown, which runs through the piston rod and parallel to the direction of movement of the piston rod. With respect to this axis there are two part-chambers R1, R2 and also the two associated piston part-surfaces K1, K2 spaced further therefrom than the third part-chamber R3 or the associated piston part-surface K3. K1 and K2 can be formed as annular surfaces and K3 can be formed as a circular surface.

Figure 8:
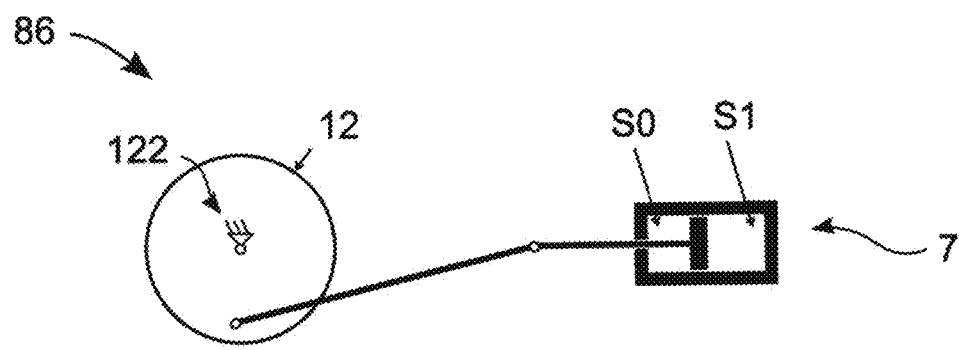
FIG. 8 shows a schematic cross-sectional representation of a compression cylinder coupled to a crank mechanism.

FIG. 8 shows a schematic cross-sectional representation of a further embodiment of an energy conversion device 86, which has a compression cylinder 7 coupled to a crank mechanism. The compression cylinder 7 has a chamber for compression of a pneumatic medium, the compression side S1, as well as a chamber for pretensioning, the pretensioning side S0. The pretensioning serves as an energy store for potential energy and can also serve as a drive, the pressure level being varied in the forward and return stroke. The energy released at the beginning in a compression operation as a result of the excess force of the pretension should be stored intermediately by conversion into kinematic energy. Since this amount of energy is enormous and at the same time the piston speed is limited, a coupling of the piston to an oscillating weight 12 is provided. Due to the continuing transmission in the dead centre the piston can be held in its end position with only a low force. A drive can be provided both by changing the preload pressure and also pneumatically or hydraulically. An additional electrical drive 122 on the oscillating weight 12 is initially provided for keeping the oscillating weight in the end positions of the piston, but can also be used as an auxiliary drive or as a main drive.

Figure 9:
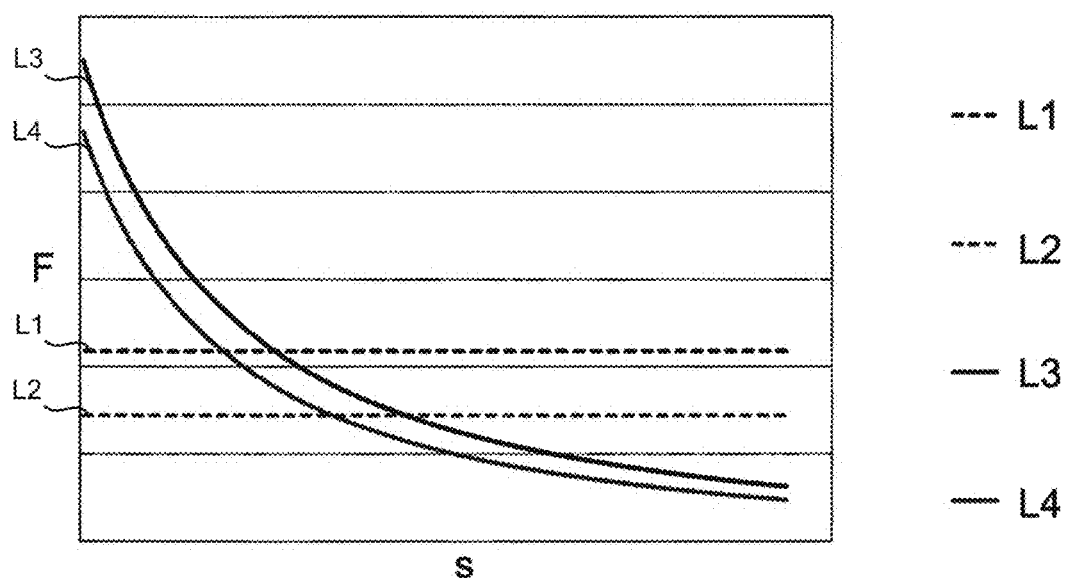
FIG. 9 shows a qualitative diagram to illustrate the piston force depending from the piston positions in the event of a mechanically coupling of a compression cylinder with a crank mechanism.

FIG. 9 shows a qualitative diagram to illustrate the piston force depending from the piston positions in the event of a mechanically coupling of a compression cylinder with a crank mechanism. In this case L1 constitutes the opposing force for a forward stroke and L2 constitutes the opposing force for a return stroke. Finally, L3 shows the dependence of the piston force in the case of a forward stroke without pretension and L4 shows the piston force in the case of a return stroke without pretension.

Figure 10:
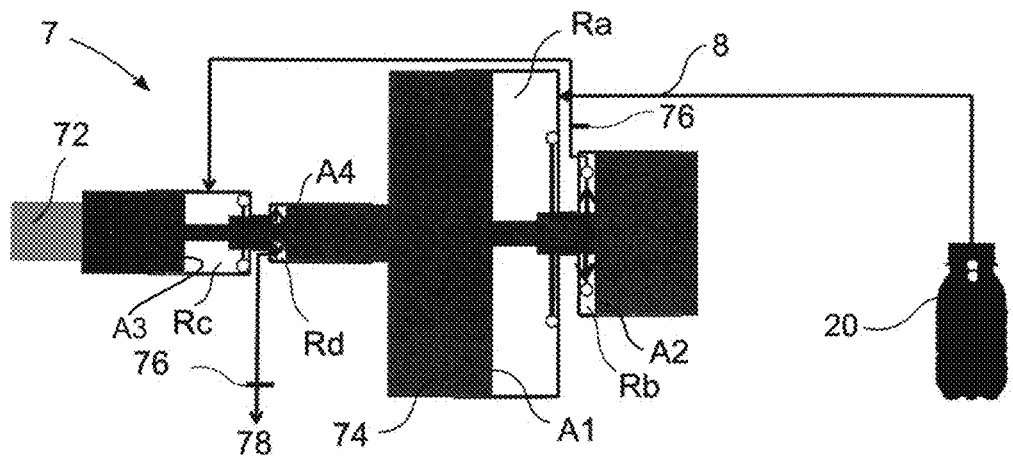
FIG. 10 shows a schematic cross-sectional representation of a compression cylinder of a further preferred embodiment of a system according to the invention.

FIG. 10 shows a schematic cross-sectional representation of a compression cylinder 7. The illustrated compression cylinder 7 has four chambers Ra, Rb, Rc and Rd. In this case the respective piston surfaces A1, A2, A3 and A4 are all mechanically connected to the piston rod 72, which can be driven by means of a drive. Pneumatically medium can be delivered to the first chamber Ra for example by means of a pressure extraction device 8, which extracts the pneumatic medium used for expansion from a finally blow moulded plastics material container 20. Such a delivery preferably takes place during a piston return stroke. During a piston return stroke the piston moves towards the left in the drawing plane. Accordingly during a piston return stroke in each case the volume of the second chamber Rb and of the fourth chamber Rd is decreased. Simultaneously the volume of the first chamber Ra and of the third chamber Rc is increased. The drawing also shows a fluid communication between the first chamber Ra and the second chamber Rb, a fluid communication between the second chamber Rb and the third chamber Rc, which may be provided with a non-return valve 76, as well as a fluid communication between the third chamber Rc and the fourth chamber Rd. An outlet conduit 78, by means of which pneumatic medium located in the fourth chamber Rd can be extracted and which can likewise be provided with a non-return valve 76, can preferably be arranged at a removal point on the fourth chamber Rd.

Moreover it is shown in FIG. 10 that the piston surfaces A1-A4 preferably have surfaces of different sizes. It is shown that the chamber Ra has the greatest piston surface A1, the chamber Rb has the second greatest piston surface A2, the chamber Rc has the third-largest piston surface A3 and the chamber Rd has the smallest piston surface A4.

In a preferred method in the first compression stage of the compression cylinder 7 in a piston return stroke of the first chamber Ra pneumatic medium is delivered and then the delivery connection is disconnected. Then a fluid communication is preferably produced between the first chamber Ra and the second chamber Rb. Therefore in the event of a piston forward stroke (movement of the piston to the right in the drawing plane) the pneumatic medium located in the first chamber Ra is preferably pushed into the second chamber Rb and is thereby compressed to an intermediate pressure level. After the end of the piston forward stroke, the fluid communication between the first chamber Ra and the second chamber Rb is disconnected again.

In the second compression stage of the compression cylinder 7, a piston return stroke and a subsequent piston forward stroke take place. In this case during the piston return stroke a fluid communication between the second chamber Rb and the third chamber Rc is produced, so that the pneumatic medium located in the second chamber Rb is pushed into the third chamber Rc. At the end of the piston return stroke, the fluid communication between the second chamber Rb and the third chamber Rc is interrupted again. In the subsequent piston forward stroke a fluid communication is produced between the third chamber Rc and the fourth chamber Rd, so that the piston surface A3 of the third chamber Rc allows the pneumatic medium located therein to flow through the produced fluid communication into the fourth chamber Rd. After termination of the piston forward stroke this fluid communication is also disconnected again. Then the pneumatic medium, which is now compressed for the second time and is located in the fourth chamber Rd, can be extracted for example by means of the outlet conduit 78.

FIGS. 11-14 show illustrations of different preferred embodiments of a method for recycling a pneumatic medium used for reshaping. In the different embodiments of the method. Individual main steps are designated by numbers placed in boxes and method steps which proceed in an analogous or similar manner respectively are designated by the same numbers. It is pointed out that subsequent numerical examples are offered merely by way of example and in each case merely constitute a preferred application of the method.

Figure 11:
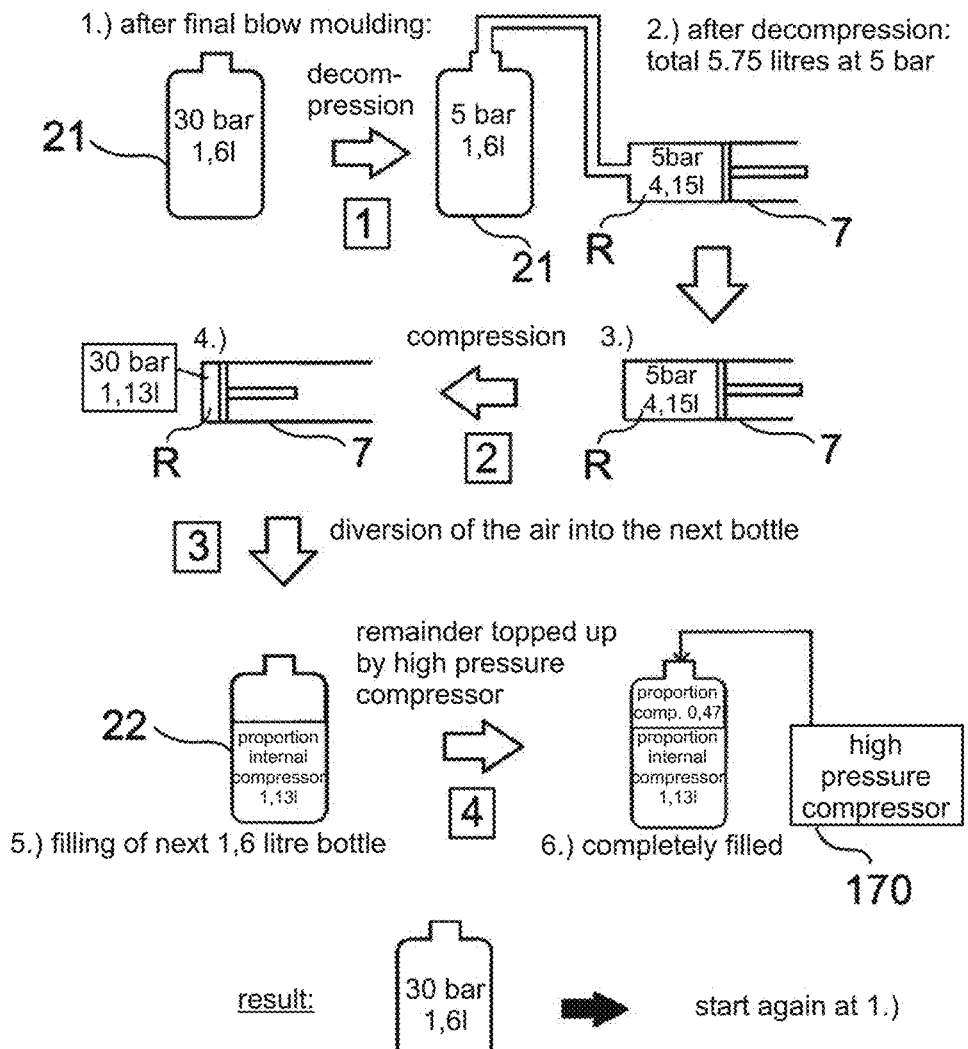
FIGS. 11-14 show illustrations of preferred embodiments of a method for recycling a pneumatic medium used for reshaping.

FIG. 11 shows a preferred embodiment of a first embodiment of the method for recycling a pneumatic medium used for reshaping without the participation of an intermediate pressure reservoir and with a high pressure compressor according to one example.

In this case after the final blow moulding of a bottle 21 (for example a plastics material container 20) in a first step (decompression) a pressure of 30 bar from the bottle is decompressed to a first pressure level, in this case 5 bar. Such a decompression is achieved by the production of a fluid communication between the bottle 21 and a chamber R. In the illustration the chamber is the chamber of a compression cylinder 7. With a capacity of the bottle 21 of for example 1.6 liters, after the decompression this is a total of 5.75 liters at 5 bar. After the termination of the decompression the fluid communication is disconnected again. Then 4.15 liters of pneumatic medium are located in the chamber R under a pressure of 5 bar.

In a second step (decompression) the pneumatic medium located in the chamber R is compressed until a second pressure level is reached, which in this case is 30 bar. Due to the compression to 30 bar the volume of the pneumatic medium is reduced to 1.13 liters.

In a third step (diversion) the medium (which is located in the chamber R) compressed to the second pressure level (in this case 30 bar) is delivered to a further blow mould 42 and in this case is diverted into the next bottle 22. The next bottle 22 may also be a plastics material preform to be expanded. Thus the proportion of this pneumatic high-pressure medium of the next bottle 22, which is obtained from intrinsic compression, amounts to 1.13 liters. The so-called next bottle 22 has (in its expanded state) a capacity of 1.6 liters. Thus the 1.13 liters of pneumatic medium obtained from intrinsic compression are not sufficient at 30 bar. A further 0.47 liters of pneumatic high-pressure medium is still necessary in order to inflate the illustrated bottle 22, that is to say preferably a plastics material preform 10, to its final form (of a plastics material container 20).

This additionally required, residual pneumatic medium below 30 bars is topped up in a fourth step by a high pressure compressor 170. Due to the proportion from the high pressure compressor 170, overall the volume (in this case 1.6 liters) of pneumatic high-pressure medium (at 30 bar) which is necessary for a processing operation (such as expanding a plastics material preform) is obtained.

Preferably, through the delivery of the volume of pneumatic high-pressure medium, which is sufficient for an expansion of a plastics material preform 10 to form a plastics material container 20, into a further plastics material preform 10 this preform is transformed or expanded respectively into a plastics material container 20. After this final blow moulding this method can be applied again and thus can be started again with the first step.

Figure 12:
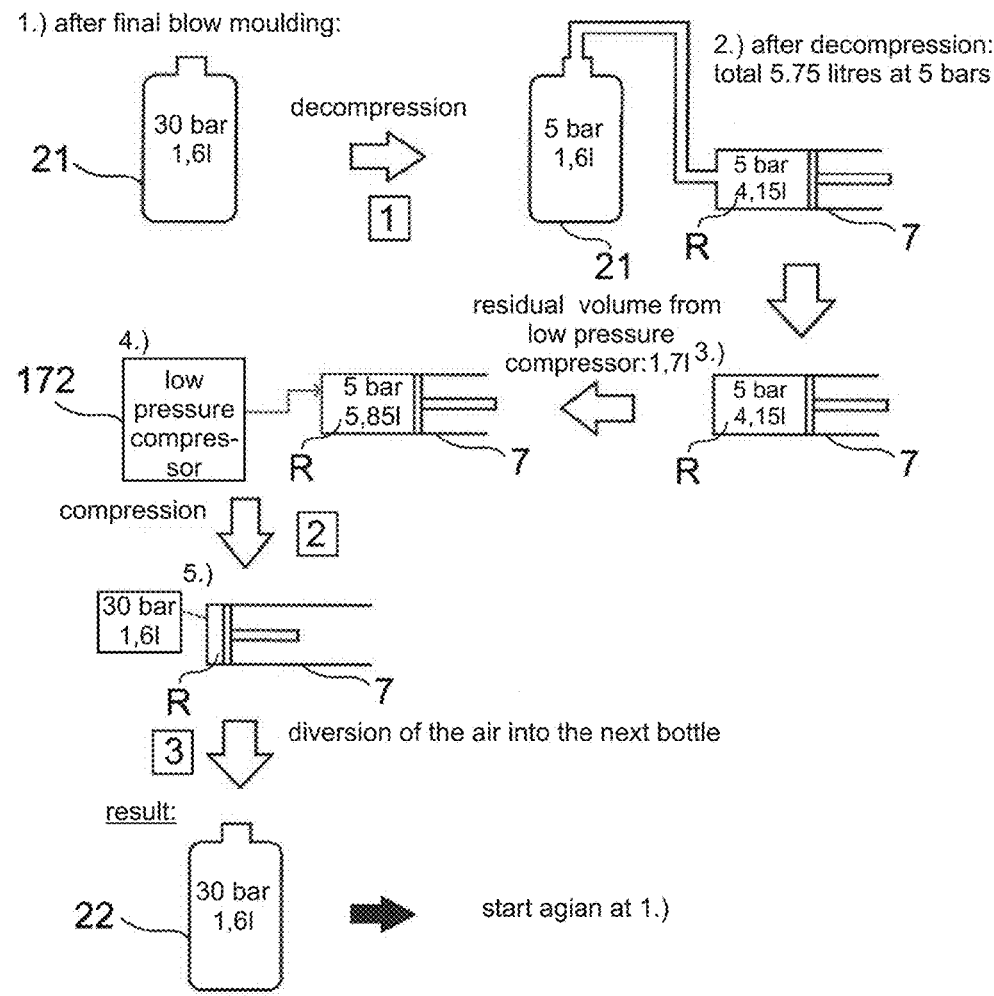

FIG. 12 shows an illustration of a preferred embodiment of a second preferred variant of the method for recycling a pneumatic medium used for reshaping without involving an intermediate pressure reservoir and with a low pressure compressor. Similarly to the first embodiment of a method just described, in a first step (decompression) 30 bar from a finally blow moulded bottle 21 (with a capacity of 1.6 liters) are decompressed to 5 bar by a fluidic connection to a chamber R. After interruption of this fluid communication, here too 4.15 liters of a pneumatic medium at 5 bar are obtained in the chamber R.

In contrast to the previously described embodiment of a method, before the second step (compression) additional pneumatic medium is now delivered to the chamber R. This delivered pneumatic medium is provided by a low pressure compressor 172 and preferably constitutes the so-called residual volume. This residual volume is the pneumatic medium required in addition to the recovered volume, so that after suitable pressure transformation of the total volume (that is to say recovered and additionally delivered pneumatic medium) a plastics material preform 10 can be inflated to a plastics material container 20 by the resulting pneumatic high-pressure medium. In the example set out here, 1.7 liters of pneumatic medium at 5 bar are delivered to the chamber R, so that the chamber then contains 5.85 liters at 5 bar.

Subsequently the second step proceeds as in the previously described embodiment of the method. The pneumatic medium located in the chamber R is compressed to 30 bar by a compression cylinder 7. The resulting volume then amounts to 1.6 liters and thus corresponds precisely to the volume which is required for expansion of a further plastics material preform 10.

In the third step this pneumatic high-pressure medium generated by intrinsic compression from the chamber R is diverted into the next bottle 22 (or a further plastics material preform 10 or further blow mould 42 respectively).

In the embodiment of the method described here the fourth step of the previously described variant of the method is omitted.

After the final blow moulding, here too it is possible to start again with the first step.

Figure 13:
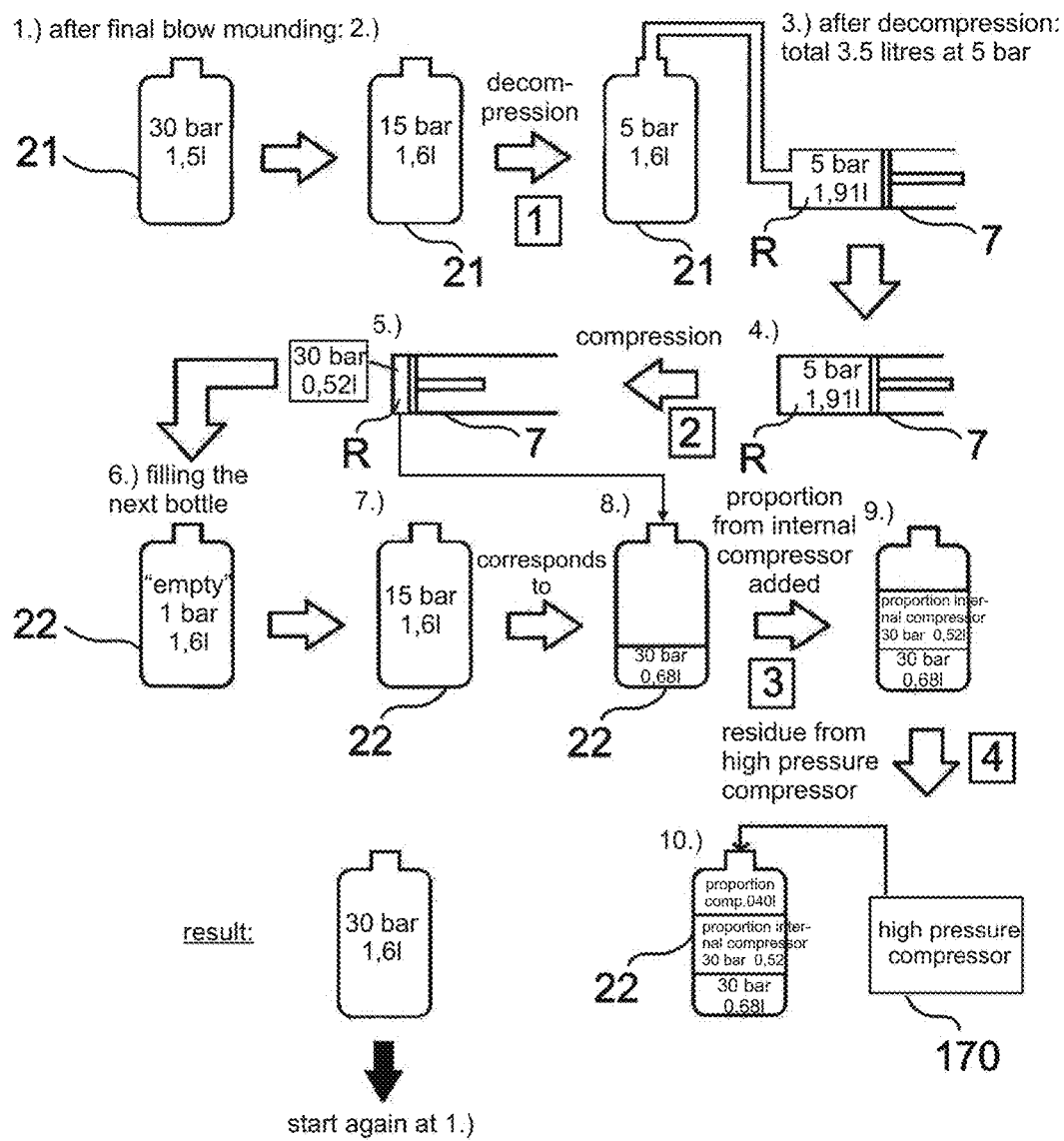

FIG. 13 shows an illustration of a preferred third variant of the method for recycling a pneumatic medium used for reshaping with the involvement of an intermediate pressure reservoir and with a high pressure compressor. The four steps of the first variant of the method described with regard to FIG. 11 proceed in principle.

This variant of the method differs in that initially the finally blow moulded bottle 21 (again 1.6 liters capacity) is fluidically connected to an intermediate pressure reservoir in which 15 bar preferably prevail. As a result the pressure in the bottle 21 reduces from initial 30 bar likewise to 15 bar.

Then, starting from a bottle 21 filled with pressure medium at 15 bar the first step (decompression) known from the first embodiment of the method is implemented. In this connection the bottle is fluidically connected to a chamber R and decompressed to 5 bar. As A result in the chamber R a volume of 1.9 liters of pneumatic medium at 5 bar is obtained.

In the subsequent second step (compression) this pneumatic medium located in the chamber R is compressed to 30 bar by a compression cylinder 7. As a result the volume of the pneumatic high pressure medium (at 30 bar) recovered by means of intrinsic compression is reduced to 0.52 liters.

In a third step this volume of pneumatic high-pressure medium recovered by means of intrinsic compression is now delivered to a further bottle 22. In contrast to the first variant of the method, however, this is not an "empty" container with an internal pressure of approximately 1 bar, but this bottle 22 has already been pre-filled with pneumatic medium, for example from the intermediate pressure reservoir. Thus the bottle 22 already has an internal pressure of 15 bar. This preliminary filling corresponds to a volume of 0.68 liters at a pressure of 30 bar.

After delivery of the recovered pneumatic high-pressure medium from the chamber R, in the fourth step residual volume at 30 bars is now delivered by a high pressure compressor 170. In this case the high pressure compressor supplements the material amount of pneumatic medium delivered to the next bottle 22 by the volume which is required for example for inflating a plastics material preform 10 to a plastics material container 20.

Thus overall the pneumatic medium delivered to the bottle 22 is made up of three proportions. A proportion of 0.68 liters at 30 bar results from the preliminary filling, a further proportion of 0.52 liters at 30 bar results from the pneumatic high-pressure medium recovered by intrinsic compression and a further proportion results from the delivery of the residual volume by the high pressure compressor 170, which as a whole produces a (necessary) volume of 1.6 liters at 30 bar.

Figure 14:
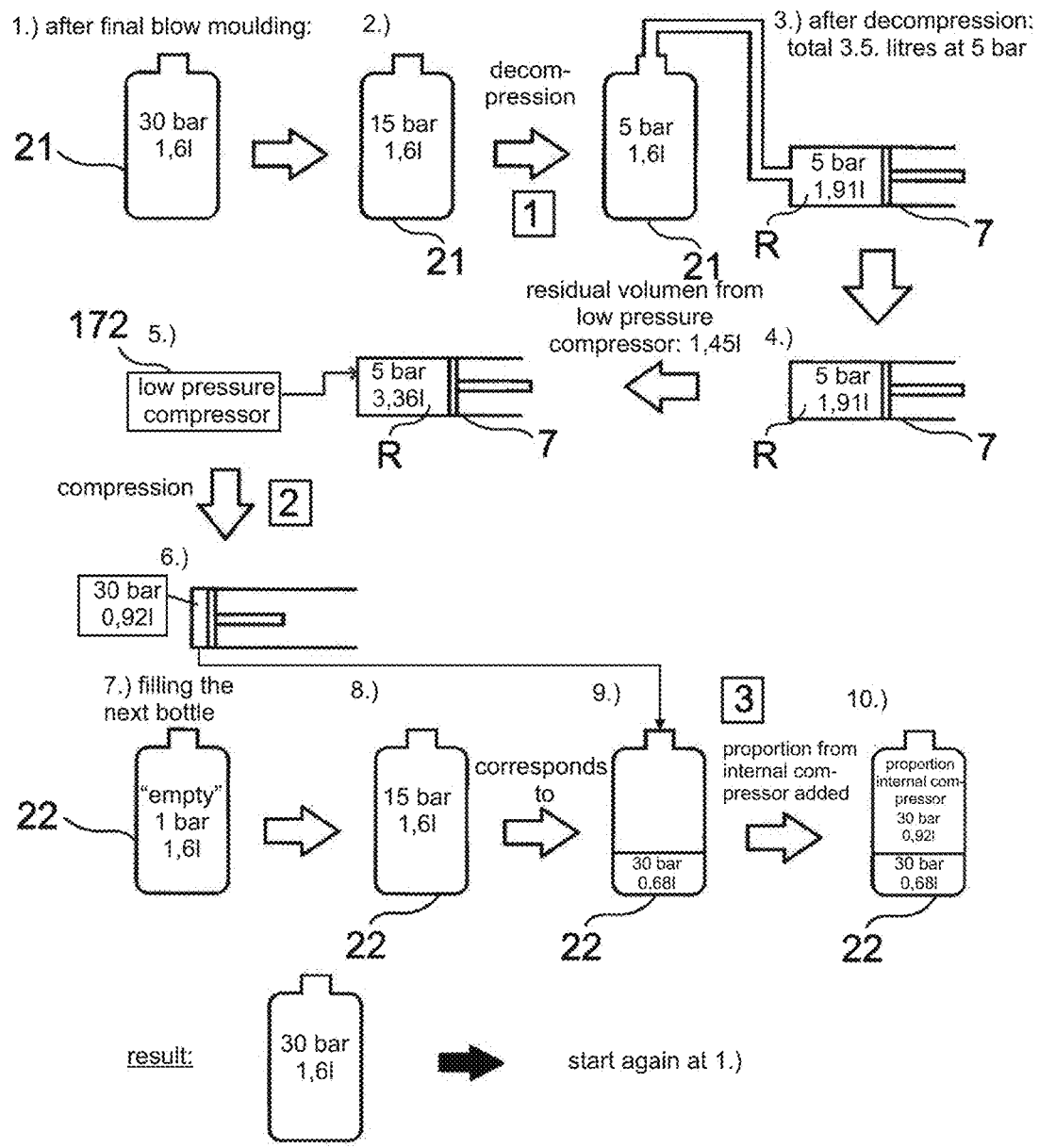

FIG. 14 shows an illustration of a preferred fourth embodiment of a method for recycling a pneumatic medium used for reshaping with the involvement of an intermediate pressure reservoir and with a low pressure compressor. Here, just as in the previously described third embodiment of the method the bottle 21 is initially connected to an intermediate pressure reservoir and as a result the internal pressure thereof is decompressed from initial 30 bar to 15 bar. Then the first step of pressure relief takes place in a chamber R to 5 bar. As already described in the embodiment of the method in FIG. 12, before the compression in a third step additional pneumatic medium is added to the chamber R.

This pneumatic medium has a pressure of 5 bar and is provided by a low pressure compressor 172. As already mentioned, in this way a corresponding volume difference (adapted appropriately to the pressure) is provided, which would be absent after compression to 30 bar for the necessary or required volume respectively of pneumatic high-pressure medium at 30 bar. In this case a volume of 1.45 liters of pneumatic medium at 5 bar are provided by the low pressure compressor 172 and delivered to the chamber R. Then in the second step a compression of the pneumatic medium located in the chamber R to 30 bar takes place, so that the volume thereof is reduced to 0.92 liters. This is diverted into an already pre-filled next bottle 22, as in the previously described variant of the method (FIG. 13). Here too, such a preliminary filling can take place by feeding in pneumatic medium from an intermediate pressure reservoir. The internal pressure of the pre-filled bottle 22 illustrated in FIG. 14 amounts to 15 bar. The total volume of pneumatic medium delivered to the next bottle 22 (at 30 bar) is made up of a proportion from the intrinsic compression of 0.92 liters (compression of the pneumatic medium in the chamber R) and of the pneumatic medium from the preliminary filling of the bottle 22, which at a pressure of 30 bar corresponds to a volume of 0.68 liters.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCES 1 system
2 carrier
4 blow moulding station
6 pressure supply device
7 compression cylinder
8 pressure extraction device
9 hydraulic cylinder
10 plastics material preform
12 oscillating weight
20 plastics material container
21 bottle
22 next bottle 42 blow mould
66 intermediate energy storage device
70 distribution device
72 piston rod
74 compression piston
76 non-return valve
78 outlet conduit
86 energy conversion device
92 fillable chamber for stroke adjustment
94 hydraulic drive
122 driving device
170 high pressure compressor
172 low pressure compressor
A axis
A1-A4 piston surfaces
F force
G1 graph for expansion operation
G2 graph for compression operation
K0 piston surface for pretensioning
K1 piston part-surface 1
K2 piston part-surface 2
K3 piston part-surface 3
L1 opposing force forward
L2 opposing force return
L3 piston force forward without pretension
L4 piston force return without pretension
P1 arrow 1
P2 arrow 2
PH1 pre-blowing phase
PH2 high pressure phase
PH3 low pressure phase
PH4 pressure relief phase
R0 chamber (on the piston rod side)
R chamber
R1 part-chamber 1
R2 part-chamber 2
R3 part-chamber 3
Ra-Rd chambers of a compression cylinder 7
s piston position
S0 pretensioning side (pretensioning chamber)
S1 compression side (compression chamber)

Key to Drawings

FIG. 11:
Nach Fertigblasen=after final blow moulding
Nach Entspannung: insgesamt 5.75 l bei 5 bar=after decompression: total 5.75 liters at 5 bar
Entspannen=decompression
Komprimieren=compression
Umleiten der Luft in die nächste Flasche=diversion of the air into the next bottle
Rest aufgefüllt durch Hochdruckkompressor=remainder topped up by high pressure compressor
Anteil Eigenkompressor=Proportion internal compressor
Anteil Kompr.=Proportion comp.
Hochdruckkompressor=high pressure compressor
Befüllen der nächsten 1.6 l Flasche=filling of next 1.6 liter bottle
Komplett befüllt=completely filled
Ergebnis=result
Wiederbeginn bei 1.)=tart again at 1.)
FIG. 12:
Nach Fertigblasen=after final blow moulding
Nach Entspannen: insgesamt 5.75 l bei 5 bar=after decompression: total 5.75 liters at 5 bars
Entspannen=decompression
Niederdruck-Kompressor=low pressure compressor
Restvolumen aus Niederdruckkompressor=residual volume from low pressure compressor
Komprimieren=compression
Umleiten der Luft in die nächste Flasche=diversion of the air into the next bottle
Ergebnis=result
Wiederbeginn bei 1.)=start again at 1.)
FIG. 13:
Nach Fertigblasen=after final blow moulding
Nach Entspannen: insgesamt 3.5 l bei 5 bar=after decompression: total 3.5 liters at 5 bar
Entspannen=decompression
Komprimieren=compression
Befüllen der nächsten Flasche=filling the next bottle
"leer"="empty"
entspricht=corresponds to
Anteil aus Eigenkompressor hinzugefügt=proportion from internal compressor added
Rest aus Hochdruckkompressor=residue from high pressure compressor
Anteil Eigenkompressor=proportion internal compressor
Anteil Kompr.=proportion comp.
Ergebnis=result
Hochdruckkompressor=high pressure compressor
Wiederbeginn bei 1).=start again at 1).
FIG. 14:
Nach Fertigblasen=after final blow moulding
Nach Entspannen: insgesamt 3.5 l bei 5 bar=after decompression: total 3.5 liters at 5 bar
Entspannen=decompression
Niederdruck-Kompressor=low pressure compressor
Restvolumen aus Niederdruckkompressor=residual volume from low pressure compressor
Komprimieren=compression
Befüllen der nächsten Flasche=filling the next bottle
"leer"="empty"
entspricht=corresponds to
Anteil aus Eigenkompressor hinzugefügt=proportion from internal compressor added
Anteil Eigenkompressor=proportion internal compressor
Ergebnis=result
Wiederbeginn bei 1).=start again at 1).

The invention claimed is:

1. A system for transforming plastics material preforms into plastics material containers, comprising:
a plurality of blow moulding stations which are arranged on a carrier, wherein each of the blow moulding stations comprises a blow mould for expanding plastics material preforms into plastics material containers inside the blow mould by a pressurised pneumatic medium which is supplied to the respective blow moulding station via a pressure supply device and which is at least partially extracted again from the respective blow moulding station after the expansion operation via a pressure extraction device; wherein the system further has an energy conversion device; with the aid of which at least part of the potential energy stored in an energy store can be turned into an increase in the potential energy of a pneumatic medium associated with at least one blow mould, wherein the energy conversion device has an intermediate energy storage device, and at least part of the potential energy extracted from the energy store, and the energy transmitted by the energy conversion device; can be stored in the form of kinetic energy in the intermediate energy storage device; wherein the energy conversion device has at least one compression cylinder, wherein a piston of the at least one compression cylinder functions as an energy converter, wherein the at least part of the potential energy extracted from the energy store is used to drive the piston and further used to compress the pneumatic medium in a compression chamber of at least one compression cylinder; wherein the energy store for the potential energy includes at least one of a chamber on at least one of a rear side of the piston or the compression chamber of the at least one compression cylinder.

2. System according to claim 1, wherein the energy conversion device is suitable and intended to extract at least part of the potential energy stored in the energy store, and at least intermittently to store a proportion of this extracted energy in the intermediate energy storage device in the form of kinetic energy, and simultaneously therewith to turn a further proportion of the extracted energy into an increase in the potential energy of the pneumatic medium associated with the at least one blow mould.

3. System according to claim 1, wherein means for pretensioning a piston of a compression cylinder are provided as an energy store for potential energy in the energy conversion device.

4. System according to claim 1, wherein the pneumatic medium which is used in an expansion operation inside a blow moulding station and at least partially delivered to a pressure chamber of a compression cylinder can be used in the energy conversion device as an energy store for potential energy.

5. System according to claim 1, wherein the intermediate energy storage device can have a pivotable or a rotatable mass respectively as kinematic intermediate storage means.

6. System according to claim 5, wherein the kinematic intermediate storage means is an oscillating weight.

7. System according to claim 1, wherein at least an amount of energy of 1 kJ of the energy extracted from the energy store and transmitted by the energy conversion device can be stored intermediately in the intermediate energy storage device.

8. System according to claim 1, wherein a reduction of the pressure of the pneumatic medium within a first blow mould can be coupled to the increase in the pressure of the pneumatic medium in a further blow mould by the energy conversion device.

9. System according to claim 1, wherein the energy conversion device is arranged on the stationary part of the system.

10. System according to claim 1, wherein the system has a driving device for driving the energy conversion device.

11. System according to claim 1, wherein dead space volume of all blow moulding stations is the same.

12. System according to claim 1, wherein on at least one blow moulding station and preferably on all blow moulding stations additional dead space volume can be connected and/or a stroke of at least one compression cylinder can be changed and/or a preliminary blow moulding pressure in at least one blow moulding station can be set independently and/or a pretensioning force in at least one compression cylinder is variable.

13. System according to claim 1, wherein the energy conversion device has at least one compression cylinder and a compression piston surface of the at least one compression cylinder has on at least one side an active surface which is variable in its surface area, wherein preferably the compression piston surface of the compression piston of the at least one compression cylinder has at least one annular surface which can be acted upon and/or at least one circular surface which can be acted upon.

14. System according to claim 1, wherein the energy conversion device has two coupled compression cylinders and is capable of and suitable for supplying several blow moulding stations of the system with pressurised pneumatic medium, wherein the two coupled compression cylinders are preferably coupled without vibration to the system or to the carrier respectively.

15. System according to claim 1, wherein the system has a control device which is suitable for connecting a first blow mould, inside which the pressure of a pneumatic medium is to be reduced, fluidically to an energy conversion device, and wherein moreover the control device is preferably suitable for, simultaneously with or following a fluidic connection of the energy conversion device to the said first blow mould, connecting the energy conversion device fluidically to a further blow mould, inside which the pressure of a pneumatic medium is to be increased or should be increased respectively.

16. Method of expanding plastics material preforms to form plastics material containers inside a blow mould of a blow moulding station by means of a pressurised pneumatic medium; wherein a plastics material preform inside at least one first blow mould of a blow moulding station is acted upon with pressurised pneumatic medium which is provided by means of a pressure supply device and is expanded to form a plastics material container, and after the expansion operation the pneumatic medium is at least partially extracted from the blow mould by means of a pressure extraction device; wherein at least part of the potential energy stored in an energy store is extracted therefrom and converted by an energy conversion device into an increase in the potential energy of a pneumatic medium associated with at least one further blow moulding station; wherein at least a part of the energy transferred from the energy conversion device is stored intermediately in the form of kinetic energy in an intermediate energy storage device, and wherein with the resulting pneumatic medium with increased potential energy at least one plastics material preform is expanded in a blow mould of the at least one further blow moulding station in order to form a plastics material container, the method further comprising:

constructing and arranging the energy conversion device to have at least one compression cylinder; wherein a piston of the at least one compression cylinder functions as an energy converter; wherein the at least part of the potential energy extracted from the energy store is used to drive the piston and further used to compress the pneumatic medium in a compression chamber of at least one compression cylinder; wherein the energy store for the potential energy includes at least one of a chamber on at least one of a rear side of the piston or the compression chamber of the at least one compression cylinder.

* * * * *